(12) United States Patent
Tobin et al.

(10) Patent No.: US 9,993,009 B2
(45) Date of Patent: Jun. 12, 2018

(54) DRY MILK FORMULA AND METHOD AND SYSTEM FOR PREPARING SAME

(71) Applicant: N.V. Nutricia, Zoetermeer (NL)

(72) Inventors: John Tobin, Mitchelstown (IE); Jitti Chiaranaipanich, Voorschoten (NL); Rudolph Eduardus Maria Verdurmen, Utrecht (NL); Antonius Hendricus Janssen, Herpen (NL); Olivier Bertrand Rabartin, Amsterdam (NL); Raoul Charles Johan Moonen, Amersfoort (NL); Martijn Johannes Van Der Hoeven, Utrecht (NL)

(73) Assignee: N.V. Nutricia, Zoetermeer (NL)

( * ) Notice: Subject to any disclaimer, the term of this patent is extended or adjusted under 35 U.S.C. 154(b) by 235 days.

(21) Appl. No.: 14/782,130

(22) PCT Filed: Apr. 3, 2014

(86) PCT No.: PCT/NL2014/050202
§ 371 (c)(1),
(2) Date: Oct. 2, 2015

(87) PCT Pub. No.: WO2014/163493
PCT Pub. Date: Oct. 9, 2014

(65) Prior Publication Data
US 2016/0044932 A1 Feb. 18, 2016

(30) Foreign Application Priority Data
Apr. 3, 2013 (WO) ................ PCT/NL2013/050248

(51) Int. Cl.
*A23C 9/15* (2006.01)
*A23L 1/29* (2006.01)
(Continued)

(52) U.S. Cl.
CPC .............. *A23C 9/1512* (2013.01); *A23C 1/00* (2013.01); *A23C 1/12* (2013.01); *A23C 9/144* (2013.01);
(Continued)

(58) Field of Classification Search
CPC ... A23C 9/1512; A23C 9/1422; A23C 9/1425; A23C 9/144; A23C 9/146; A23C 1/12; A23L 33/40; A23V 2002/00
See application file for complete search history.

(56) References Cited

U.S. PATENT DOCUMENTS 3,235,386 A * 2/1966 Mykleby .............. A23C 9/1512
426/41
3,320,072 A * 5/1967 Clark ..................... A23C 9/144
204/522
(Continued)

FOREIGN PATENT DOCUMENTS

EP 1 133 238 9/2001
EP 1226759 * 7/2002
(Continued)

OTHER PUBLICATIONS

International Search Report issued in International Patent Application No. PCT/NL2014/050203 dated Jul. 7, 2014.
(Continued)

*Primary Examiner* — Anthony Weier
(74) *Attorney, Agent, or Firm* — Gilberto M. Villacorta; Sunit Talapatra; Foley & Lardner LLP

(57) ABSTRACT

A process and system is shown for obtaining a dry milk formula, having (a-i) ultrafiltration of an animal skim milk composition having 70-90 wt % casein and 10-30 wt % whey proteins, based on total protein, and (a-ii) ultrafiltration of an animal whey composition having 0-25 wt % casein and 75-100 wt % whey proteins, based on total
(Continued)

protein; or (a-iii) ultrafiltration of a mixture of the compositions of (a-i) and (a-ii), (b) removing polyvalent ions from the UF permeate originating from step (a-i) and/or (a-ii) or (a-iii) to obtain at least one softened UF permeate; (c) combining the at least one softened UF permeate with a UF retentate to obtain a combined product; and (d) drying the combined product to obtain a dry milk formula.

19 Claims, 1 Drawing Sheet

(51) Int. Cl.
    *A23C 1/12*           (2006.01)
    *A23C 9/142*         (2006.01)
    *A23C 9/144*         (2006.01)
    *A23C 9/146*         (2006.01)
    *A23C 1/00*           (2006.01)
    *A23L 33/00*         (2016.01)

(52) U.S. Cl.
    CPC ............ *A23C 9/146* (2013.01); *A23C 9/1422* (2013.01); *A23C 9/1425* (2013.01); *A23L 33/40* (2016.08); *A23V 2002/00* (2013.01)

(56) References Cited

U.S. PATENT DOCUMENTS

| | | | |
|---|---|---|---|
| 4,268,528 A * | 5/1981 | Montigny | A23C 19/0285 426/36 |
| 4,497,836 A | 2/1985 | Marquardt et al. | |
| 4,518,616 A * | 5/1985 | Czulak | A23C 19/0285 426/40 |
| 5,118,516 A | 6/1992 | Shimatani et al. | |
| 5,169,666 A | 12/1992 | Woychik | |
| 5,503,865 A | 4/1996 | Behringer et al. | |
| 5,639,502 A | 6/1997 | Behringer et al. | |
| 6,440,222 B1 * | 8/2002 | Donovan | B01D 61/142 127/43 |
| 6,689,402 B1 * | 2/2004 | Nauth | A23C 19/0285 426/34 |
| 2002/0146500 A1 * | 10/2002 | Smith | A23C 9/1504 426/580 |
| 2007/0104847 A1 * | 5/2007 | O'Mahony | A23C 9/1422 426/582 |
| 2011/0281012 A1 | 11/2011 | Glas et al. | |
| 2012/0189737 A1 * | 7/2012 | Andersen | A23C 3/03 426/41 |
| 2012/0215828 A1 * | 8/2012 | Torii | G06F 3/1205 709/202 |
| 2013/0064923 A1 | 3/2013 | Remondetto et al. | |
| 2013/0287892 A1 * | 10/2013 | Knights | A23C 1/14 426/42 |
| 2015/0044352 A1 * | 2/2015 | Van Den Brenk | A23D 7/011 426/590 |
| 2015/0079265 A1 * | 3/2015 | Van Den Brenk | A23D 7/011 426/590 |
| 2015/0093490 A1 * | 4/2015 | Tobin | A23C 9/1422 426/587 |
| 2016/0044932 A1 * | 2/2016 | Tobin | A23C 9/1422 426/239 |
| 2016/0044933 A1 * | 2/2016 | Tobin | A23C 9/1422 426/239 |
| 2016/0205960 A1 * | 7/2016 | Tobin | A23C 9/1425 |
| 2016/0219911 A1 * | 8/2016 | Van Den Brenk | A23L 33/17 |
| 2016/0278413 A1 * | 9/2016 | Van Den Brenk | A23D 9/05 |

FOREIGN PATENT DOCUMENTS

| | | | |
|---|---|---|---|
| GB | 2404560 | * | 9/2005 |
| IE | 84134 | * | 2/2006 |
| WO | WO 96/08155 A1 | | 3/1996 |
| WO | WO 00/30461 A1 | | 6/2000 |
| WO | WO 01/93689 A1 | | 12/2001 |
| WO | WO-2008/077071 A1 | | 6/2008 |
| WO | WO-2011/051557 A1 | | 5/2011 |
| WO | WO 2012/110705 A1 | | 8/2012 |

OTHER PUBLICATIONS

International Search Report issued in International Patent Application No. PCT/NL2014/050202 dated Jun. 10, 2014.

* cited by examiner

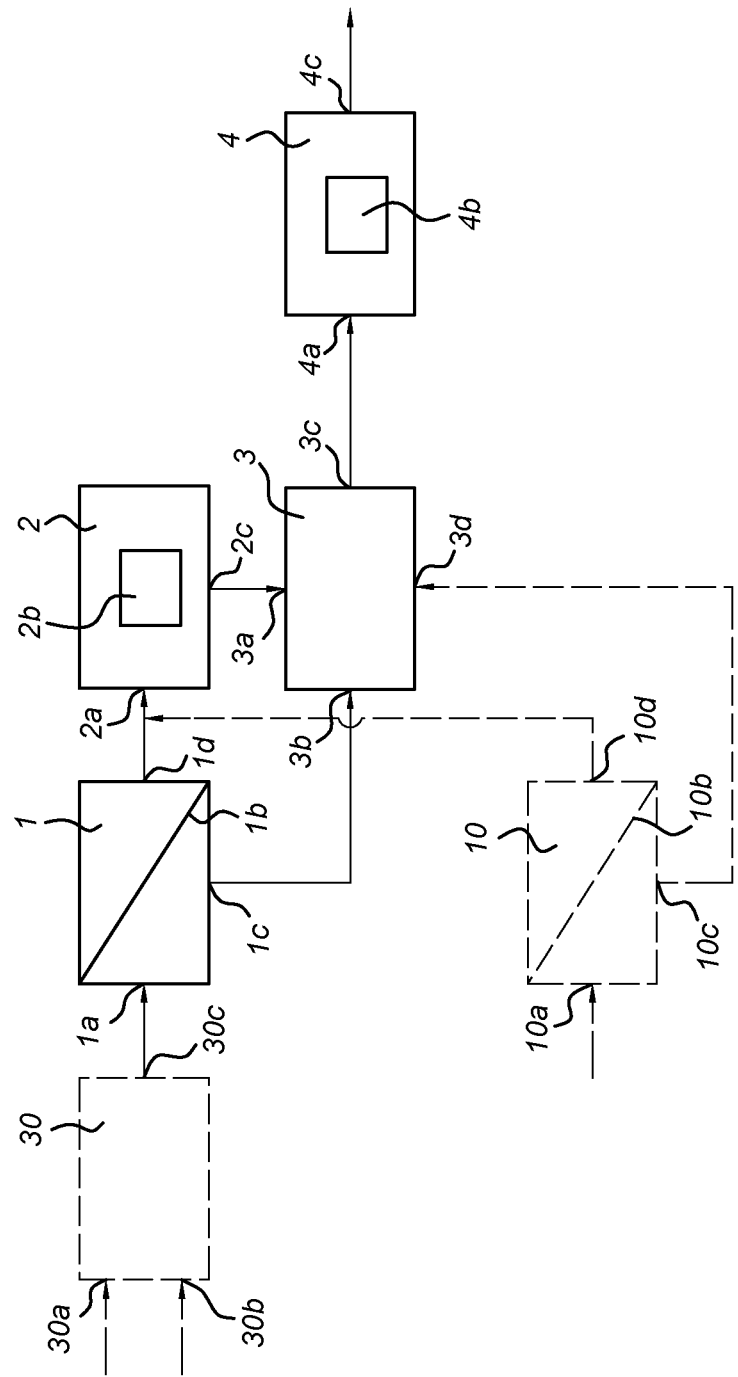

DRY MILK FORMULA AND METHOD AND SYSTEM FOR PREPARING SAME

CROSS-REFERENCE TO RELATED APPLICATIONS

This application is the National Phase of International Patent Application No. PCT/NL2014/050202, filed Apr. 3, 2014, published on Oct. 9, 2014 as WO 2014/163493 A1, which claims priority to International Patent Application No. PCT/NL2013/050248, filed Apr. 3, 2013. The contents of which are herein incorporated by reference in its entirety.

The present invention relates to an advanced process for treating animal skim milk and animal whey, preferably for the manufacture of dry milk formulae such as infant milk formulae and other nutritional products for infants, as well as a system designed to implement the process according to the invention.

BACKGROUND OF THE INVENTION

Human milk is considered the 'golden standard' for infant nutrition. Processing animal milk, for example cow's milk, to more resemble the composition of human milk is known in the art. Such processing is known in the art as 'humanizing' animal milk. The process of humanizing animal milk involves changing the ratio of casein:whey proteins as found in animal milk (e.g. approximately 80:20 for cows' milk) to the desired ratio for infant nutrition as found in human milk (preferably between 75:25 and 30:70). In addition, the mineral content of animal milk is typically higher that the content found in human milk. Thus humanization of animal milk also involves reducing of the mineral content.

Preparation of products suitable for use in infant nutrition typically involves blending of various individually purified components in the appropriate ratios, either wet or dry. Current manufacturing processes require multiple dairy ingredients from intermediate suppliers, including skim milk or a concentrate thereof (including skim milk powder), demineralised whey or a concentrate thereof (including demineralised whey powder), whey protein concentrates or isolates (normally as powders), and pure grade lactose (typically in powder form) to formulate a nutritionally balanced infant formula.

WO 96/08155 describes a process for treating skim milk for the manufacture of cheese and milk powders, wherein whey proteins are removed from skim milk by microfiltration and further treatment includes ultrafiltration.

U.S. Pat. No. 5,503,865 discloses a process for treating skim milk, comprising microfiltration or ultrafiltration. The permeate thereof may be demineralised by for example ion exchange and/or electrodialysis in order to make it suitable to be used in baby products.

U.S. Pat. No. 4,497,836 discloses a process wherein whey is subjected to ultrafiltration, and the permeate thereof is subjected to electrodialysis or ion exchange.

WO 2001/93689 discloses a process wherein milk serum is subjected to ultrafiltration, and the permeate thereof is subjected to diafiltration. The ultrafiltration retentate is combined with the diafiltration retentate in the production of infant milk formulae, by mixing the combined product with milk powder.

EP 1133238 describes a process wherein animal milk is subjected to microfiltration through a membrane having a porosity of 0.1-0.2 micrometer, after which the microfiltration permeate comprising whey proteins is demineralised by electrodialysis. The mineral content of the electrodialyzed microfiltration permeate is very low, and subsequent fortification with minerals and trace elements is required to obtain an infant formula.

SUMMARY OF THE INVENTION

It is an object of the present invention to provide an improved process for preparing or obtaining a dry milk formula wherein the amount of filtration and separation steps are reduced compared to existing methods, problems related to membrane fouling are reduced and yield in obtaining lactose or milk proteins is improved. This object, wholly or in part, is solved by the present invention according to the appended claims.

In general, the present invention relates to a process for obtaining a dry milk formula in which more optimal use is made of filtration and separation technologies. In a preferred embodiment, the present invention relates to a process for obtaining a dry milk formula, preferably for obtaining a dry milk formula that can be further processed into an infant milk formula or a dry milk infant formula (for human infants). Preferably, the process of the present invention involves ultrafiltration of animal skim milk and ultrafiltration of animal whey followed by mixing of the ultrafiltration retentates, which are enriched in milk proteins and whey proteins respectively. Adding animal whey to animal skim milk alters the protein composition of the skim milk, thereby humanizing the skim milk to more resemble the protein composition of human milk. Both animal skim milk and animal whey contain polyvalent ions, the contents of which are reduced in order to make the combination of animal skim milk and animal whey suitable as dry milk formulation for human consumption or as a nutritional formulation for feeding human infants. In a preferred embodiment, also monovalent ions are removed from the UF permeate and/or the UF retentate to sufficiently low levels such that the dry milk formula is adapted for feeding human infants. Thus, broadly worded, the present invention relates to a process for obtaining a dry milk formula comprising the steps of ultrafiltrating of animal skim milk and animal whey, removing polyvalent ions from at least one UF permeate, and combining the softened UF permeate with the UF retentate followed by a drying step to obtain the dry milk formula.

The process according to the invention employs ultrafiltration for fractioning of casein and whey proteins from lower molecular weight animal skim milk and animal whey constituents (e.g. soluble salts, lactose, non-protein nitrogen (NPN), organic acids). As such, neither the animal skim milk nor the whey require further softening or removal of monovalent ions to the extent which is ordinarily done in the art, in order to reduce the soluble salts content to a desirably low level, preferably sufficiently low for infant nutrition preparation. The process according to the invention circumvents the need for including extensively softened or demineralized whey proteins or extensive softening or demineralization of liquid whey protein streams, or the need for externally adding large amounts of dry crystalline lactose for the manufacture of dry milk powder suitable for infant nutrition preparation, by employing ultrafiltration of animal skim milk and animal whey which are combined in a preferred ratio to humanize animal skim milk.

The lactose that is removed from both the animal skim milk and the animal whey as ultrafiltration permeate is subjected to polyvalent ion removal and preferably monovalent ion removal, and used in the resulting dry milk formula. As such, the mineral content of the resulting formulation can be adapted to sufficiently low levels to enable infant nutrition preparation according to regulatory bodies (e.g. EU directive 2006/141/EC, US Food and Drug Administration 21 CFR Ch 1 part 107).

Consequently, the present invention relates to a process for obtaining a dry milk formula, comprising the steps of:
(a-i) ultrafiltration (UF) of an animal skim milk composition comprising 70-90 wt % casein and 10-30 wt % whey proteins, based on total protein, and
(a-ii) ultrafiltration of an animal whey composition comprising 0-25 wt % casein and 75-100 wt % whey proteins, based on total protein; or
(a-iii) ultrafiltration of a mixture of the compositions of (a-i) and (a-ii),
(b) preferably combining of the UF retentate originating from step (a-i) with the UF retentate originating from step (a-ii);
(c) removing polyvalent ions from the UF permeate originating from step (a-i) and/or (a-ii) or (a-iii) to obtain at least one softened UF permeate;
(d) combining the at least one softened UF permeate originating from step (c) with a UF retentate originating from step (a-i) and/or (a-ii), or (a-iii) or (b) to obtain a combined product; and
(e-i) drying the combined product originating from step (d) to obtain a dry milk formula, and/or
(e-ii) drying any UF retentate originating from step (a-i) and/or (a-ii) or (a-iii) or (b) which is not combined in step (d), and drying any of the softened UF permeates originating from step (c) which is not combined in step (d), followed by combining the dried UF retentate with the dried softened UF permeate to obtain a dry milk formula.

In another aspect, the present invention relates to a modular system for carrying out the process according to the invention, comprising:
(1) an ultrafiltration module, comprising
  (1a) an inlet for receiving a first liquid composition as meant herein and/or a second liquid composition as meant herein, or a mixture thereof, to a first side of an ultrafiltration membrane,
  (1b) the ultrafiltration membrane,
  (1c) a first outlet for discharging an ultrafiltration retentate (UFR) from the first side of the ultrafiltration membrane, and
  (1d) a second outlet for discharging an ultrafiltration permeate (UFP) from the second side of the ultrafiltration membrane;
(2) a polyvalent ion removal module, comprising
  (2a) an inlet for receiving the UFP originating from the ultrafiltration module (1),
  (2b) means for removing polyvalent ions, and
  (2c) an outlet for discharging a softened UFP;
(3) at least one mixing module, comprising
  (3a) a first inlet for receiving the softened UFP originating from the polyvalent ion removal module (2),
  (3b1) a second inlet for receiving the first liquid composition or an UFR of the first liquid composition and a third inlet for receiving the second liquid composition or an UFR of the second liquid, or
  (3b2) a second inlet for receiving the mixture of the first liquid composition and the second liquid composition or an UFR of the first liquid composition and an UFR of the second liquid composition, and
  (3c) an outlet for discharging a recombined product; and
(4) a drying module, comprising
  (4a1) a first inlet for receiving the UFR originating from the ultrafiltration module (1) and a second inlet for receiving the softened UFP originating from the polyvalent ion removal module (2), or
  (4a2) an inlet for receiving the recombined product originating from the mixing module (3),
  (4b) drying means, and
  (4c) an outlet for discharging a dried composition, wherein the first liquid composition is an animal skim milk composition comprising 70-90 wt % casein and 10-30 wt % whey proteins, based on total protein, and wherein the second liquid composition is an animal whey composition comprising 0-25 wt % casein and 75-100 wt % whey proteins, based on total protein.

List of Preferred Embodiments

The invention particularly pertains to:
1. A process for obtaining a dry milk formula, comprising the following steps:
(a-i) ultrafiltration (UF) of an animal skim milk composition comprising 70-90 wt % casein and 10-30 wt % whey proteins, based on total protein, and
(a-ii) ultrafiltration of an animal whey composition comprising 0-25 wt % casein and 75-100 wt % whey proteins, based on total protein; or
(a-iii) ultrafiltration of a mixture of the compositions of (a-i) and (a-ii),
(b) preferably combining of the UF retentate originating from step (a-i) with the UF retentate originating from step (a-ii);
(c) removing polyvalent ions from the UF permeate originating from step (a-i) and/or (a-ii) or (a-iii) to obtain at least one softened UF permeate;
(d) combining the at least one softened UF permeate originating from step (c) with a UF retentate originating from step (a-i) and/or (a-ii), or (a-iii) or (b) to obtain a combined product; and
(e-i) drying the combined product originating from step (d) to obtain a dry milk formula, and/or
(e-ii) drying any UF retentate originating from step (a-i) and/or (a-ii) or (a-iii) or (b) which is not combined in step (d), and drying any of the softened UF permeates originating from step (c) which is not combined in step (d), followed by combining the dried UF retentate with the dried softened UF permeate to obtain a dry milk formula.
2. The process according to 1, wherein the animal skim milk comprises 75-85 wt % casein and 15-25 wt % whey proteins, based on total protein, preferably about 80 wt % casein and about 20 wt % whey protein or the animal skim milk composition comprises or is selected from animal skim milk, diluted animal skim milk, concentrated animal skim milk, (optionally diluted) skim milk concentrate or reconstituted skim milk powder.
3. The process according to 1, wherein the animal whey composition comprises 0-20 wt % casein and 80-100 wt % whey proteins, based on total protein, preferably 0-10 wt % casein and 90-100 wt % whey proteins, more preferably 0-5 wt % casein and 95-100 wt % whey proteins or the animal whey composition comprises or is selected from animal whey, diluted animal whey, concentrated animal whey, (optionally diluted) animal whey concentrate and reconstituted animal whey powder. Preferably, the animal whey is or comprises sweet whey and/or acid whey, preferably the animal whey is sweet whey.
4. The process according to any one of 1-3, wherein a UF permeate originating from step (a-i) and a UF permeate originating from step (a-ii) are combined prior to said removal of polyvalent ions of step (c).

5. The process according to any one of 1-4, wherein a UF retentate originating from step (a-i) and/or (a-ii) is/are concentrated prior to the combining of step (b), (d) or drying of step (e-i) and/or (e-ii); and/or a UF retentate originating from step (a-iii) and/or (b) is/are concentrated prior to the combining of step (d) or drying of step (e-i) and/or (e-ii), preferably by nanofiltration.

6. The process according to any of 1-5, wherein the UF permeate originating from step (a-i) is combined with a permeate originating from (a-ii) prior to polyvalent ion removal of step (c), and preferably concentrated after polyvalent ion removal of step (c).

7. The process according to any of 1-6, wherein the softened UF permeate originating from step (c) and/or the combined product of step (d) is/are concentrated, prior to the combining of step (d) or the drying of step (e-i) and/or (e-ii).

8. The process according to any of 5-7, wherein concentration occurs by reverse osmosis and/or nanofiltration.

9. The process according to any one of 1-8, wherein polyvalent ion removal of step (c) occurs by electrodialysis, ion exchange, lactose crystallization and/or salt precipitation, more preferably by a combination of nanofiltration, salt precipitation, ultrafiltration and electrodialysis, most preferably following the sequence of nanofiltration, salt precipitation, ultrafiltration and electrodialysis.

10. The process according to any one of 1-9, wherein the softened UF permeate of step (c) and/or the UF retentate originating from step (a-i) and/or (a-ii) or (a-iii) or (b) is/are subjected to monovalent ion removal, preferably by electrodialysis, nanofiltration, lactose crystallization and/or salt precipitation.

11. The process according to any one of 1-10, wherein a UF retentate originating from step (a-i) and/or (a-ii), or (a-iii) or (b) and/or a UF permeate originating from step (a-i) and/or (a-ii) or (a-iii), and/or the softened UF permeate originating from step (c) or the combined product of step (d) is/are heat-treated, preferably heat-sterilized by DSI, prior to the drying of step (e-i) and/or (e-ii); preferably the combined product of step (d) is heat-treated, preferably by DSI, prior to the drying of step (e-i); or preferably any of the UF retentates of step (e-ii) and/or any of the softened UF permeates of step (e-ii) is heat-treated, preferably by DSI, prior to the drying of step (e-ii).

12. The process according to any one of 1-11, wherein drying of step (e-i) and/or (e-ii) is by spray-drying.

13. The process according to any one of 1-12, wherein the combined product originating from step (d), the dried combined product of (e-i), and/or the dried UF retentate of (e-ii) which is combined with the dried softened UF permeate of (e-ii) in step (e-ii) is further processed into a nutritional product for providing nutrition to infants. Preferably, to the combined product originating from step (d) is/are added suitable amounts of fat or oils, dietary fiber, optionally additional lactose, vitamins and optionally additional minerals.

14. The process according to any one of 1-13, wherein the animal skim milk composition and animal whey composition of step (a-iii) or the UF retentates originating from step (a-i) and (a-ii) are combined in such a ratio that a product is obtained having a casein:whey protein weight ratio of between 75:25 to 30:70, preferably between 64:36 to 36:64, more preferably 60:40 to 40:60 or about 50:50.

15. The process according to any one of 1-13, wherein mixture of the animal skim milk composition and animal whey composition of step (a-iii) or the combined UF retentate of step (b), or the combined product of step (d), the dry milk formula of (e-i) or the dry milk formula of (e-ii) has a casein:whey protein weight ratio of between 75:25 and 30:70, more preferably between 70:30 and 35:65, most preferably between 64:36 and 36:64 or about 50:50.

16. The process according to any one of 1-15, wherein the at least one softened UF permeate of step (c) is obtained in a single polyvalent ion removal step or treatment.

17. The process according to any one of 1-16, wherein any UF retentate originating from step (a-i) and/or (a-ii), or step (a-iii) or step (b) is subjected to a maximum of two or preferably only one concentration and/or monovalent ion removal step and preferably to one or no polyvalent ion removal step before being subjected to the (e-i) or (e-ii) drying step.

18. The process according to any one of 1-7, wherein a UF permeate originating from step (a-i) and a UF permeate originating from step (a-ii) are combined prior to said combining in step (d), or preferably combined prior to the removal of polyvalent ions of step (c).

19. The process according to any one of 1-18, wherein the UF permeate originating from step (a-i) and the UF permeate originating from step (a-ii) are combined in a volume ratio of between 10:1 and 1:20, preferably 5:1 and 1:15, more preferably 1:1 and 1:10, most preferably between 1:2 and 1:6.

20. The process according to any one of 1-19, wherein the mixture of step (a-iii) is obtained by combining the animal skim milk composition and the animal whey composition in a volume ratio of between 10:1 and 1:10, preferably 6:1 and 1:6, more preferably 3:1 and 1:3 or wherein the combining in step (b) comprises combining the UF permeate originating from step (a-i) with the UF permeate originating from step (a-ii) in a volume ratio of between 10:1 and 1:10, preferably 6:1 and 1:6, more preferably 3:1 and 1:3.

21. The process according to any one of 1-20, wherein the UF retentate originating from step (a-i), (a-ii), (a-iii) and (b) are enriched for casein and whey proteins compared to the first animal skim milk and second animal whey compositions, and/or the UF permeate originating from step (a-i), (a-ii) and (a-iii) is enriched for lactose compared to the first animal skim milk and second animal whey compositions.

22. The process according to any one of 1-21, wherein the ultrafiltration, polyvalent ion removal step, monovalent ion removal step, any concentration step and/or any combining step is performed at a temperature below 40° C., more preferably between 3° C. and 30° C. even more preferably between 5° C. and 20° C., most preferably between 8 and 12° C. Higher temperatures may increase the risk of spoilage of the dairy products, and lower temperatures may give rise to freezing of the liquid streams, which are both undesirable.

23. The process according to any one of 1-22, wherein the process operates with 500-2500 kg, more preferably 800-1800 kg, most preferably 1000-1400 kg dry matter of the animal skim milk composition incoming per hour. 24. The process according to any one of 1-23, wherein the process according to the invention operates with 1500-5000 kg, more preferably 2200-4000 kg, most preferably 2600-3000 kg dry matter of the animal whey composition, incoming per hour.

25. The process according to any one of 1-24, wherein the process according to the invention preferably operates with 750-4000 kg, more preferably 1000-3000 kg, most preferably 1500-2000 kg UF retentate obtained per hour from the ultrafiltration of (a-i) and (a-ii) or (a-iii).

26. The process according to any one of 1-25, wherein the process according to the invention preferably operates with 1000-5000 kg, more preferably 1500-4000 kg, most preferably 2000-2500 kg UF permeate obtained per hour from the ultrafiltration of (a-i) and (a-ii) or (a-iii).

27. The process according to any one of 1-26, wherein the ultrafiltration of step (a-i) is operated using a volume concentration factor of 1.5-6, preferably 1.7 to 4, more preferably 1.8 to 3, most preferably about 2, and the ultrafiltration of step (a-ii) is operated using a volume concentration factor of 2-15, preferably 3-10, more preferably 4-7, most preferably about 5 and the ultrafiltration of step (aii-i) is operated using a volume concentration factor of 1.5-10, preferably between 2 and 8, more preferably between 3 and 6, most preferably about 4.

28. The process according to any one of 1-27, wherein at least 10 or 20 wt % of the polyvalent ions that are present in said UF permeate (on dry weight basis thereof) is removed, preferably at least 50 wt %, 60 wt %, more preferably 70 wt % or at least 80 wt %, most preferably at least 90 wt %.

29. The process according to any one of 1-28, wherein monovalent ion removal comprises removal of at least 10 or 20 wt % (on dry weight basis) of the monovalent ions from the composition which was subjected to a monovalent ion removal step, more preferably at least 35 wt % or 50 wt %, most preferably at least 60 wt %.

30. The process according to any one of 1-29, wherein the mixture of (a-iii) comprises a casein:whey protein ratio of between 75:25 and 30:70, more preferably between 70:30 and 35:65, most preferably between 64:36 and 36:64 or about 50:50.

BRIEF DESCRIPTION OF THE DRAWINGS

FIG. 1 depicts preferred embodiments of the system according to the invention.

DETAILED DESCRIPTION OF THE INVENTION

Present day manufacturers of dry milk (infant) nutritional compositions largely rely on supply and use of highly purified ingredients, such as purified lactose, demineralized whey proteins and minerals, to produce said compositions by mixing these sourced ingredients. The present inventors have designed a process for treating animal skim milk and animal whey for manufacturing dry dairy products, in particular dry milk formulations, which largely circumvents buying such high-grade, pure ingredients from third parties.

The process of the present invention has several advantages over existing methods of producing dry milk formulae, e.g. the loss in lactose yield and whey during the processing of skim milk and whey is reduced (e.g. during conventional demineralization of whey and crystallization of lactose), complications related to fouling of membranes and deposition of protein material are reduced, the use of (externally added) chemicals is reduced and waste water may be recycled in the process to a large extent. As such, the amount of waste and waste streams is reduced compared to the conventional process. In addition, the need for energy consuming drying, softening and demineralization steps is reduced. More in particular, whereas lactose yield in conventional purification methods for the production of dairy products lies around 83-85%, the lactose yield can be improved to over 90% in the process of the present invention. Hence, the process according to the invention has a lower environmental impact compared to the conventional process for producing dairy products such as dry formulae or milk powders, in particular nutritional products for feeding infants.

The process according to the invention employs two incoming liquid compositions (i.e. step (a-i) and (a-ii)); the first thereof is an animal skim milk composition comprising 70-90 wt % casein and 10-30 wt % whey proteins, based on total protein, and the second thereof is an animal whey composition being comprising 0-25 wt % casein and 75-100 wt % whey proteins, based on total protein. At one point in the process, the first and second liquid compositions are combined or mixed. This combining or mixing may occur prior to ultrafiltration, such that the ultrafiltration of step (a-iii) is performed on a mixture of the first and the second liquid composition. Alternatively, the combining or mixing may occur after ultrafiltration, such that ultrafiltration is performed on the first liquid composition in step (a-i) and the second liquid composition in step (a-ii).

In a first advantageous embodiment, the present invention relates to a process for obtaining a dry milk formula, wherein preferably a single ultrafiltration step is conducted, comprising the following steps:
(a-iii) ultrafiltration of a mixture of an animal skim milk composition comprising 70-90 wt % casein and 10-30 wt % whey proteins, based on total protein, and an animal whey composition comprising 0-25 wt % casein and 75-100 wt % whey proteins, based on total protein,
(c) removing polyvalent ions from the UF permeate originating from step (a-iii) to obtain a softened UF permeate;
(d) combining the softened UF permeate originating from step (c) with a UF retentate originating from step (a-iii) to obtain a combined product; and
(e-i) drying the combined product originating from step (d) to obtain a dry milk formula.

In this first advantageous embodiment, the ratio of casein to whey protein can be influenced by selecting the volume ratio of the animal skim milk composition the animal whey composition to be ultrafiltrated. Thus, in this embodiment, preferably the animal skim milk composition and animal whey composition of step (a-iii) are combined in such a ratio that a UF retentate product is obtained having a casein:whey protein weight ratio of between 75:25 to 30:70, preferably between 64:36 to 36:64, more preferably 60:40 to 40:60 or about 50:50. Preferably, a volume ratio of between 10:1 and 1:10, preferably 6:1 and 1:6, more preferably 3:1 and 1:3 of the animal skim milk composition to the animal whey composition is used to achieve this end. This UF retentate product is preferably subjected to a concentration and/or monovalent ion removal step before being combined with the softened permeate in step (d). Preferably, this UF retentate product is subjected to a single concentration step (e.g. reverse osmosis and/or nanofiltration) during which also monovalent ions are removed before being combined with the softened permeate in step (d).

Furthermore, in this first advantageous embodiment, removing polyvalent ions in step (c) to obtain a softened UF permeate, is followed by a monovalent ion removal step (preferably by a nanofiltration and/or diafiltration step) before combining in step (d) takes place. This is especially preferred when ion exchange against monovalent ions is used for softening. The lactose enriched, softened UF permeate may be subjected to one, two or three nanofiltration and/or reverse osmosis steps to remove sufficient monovalent ion amounts when preparing a dry milk formulation usable for feeding a human infant.

Furthermore, in this first advantageous embodiment, ultrafiltration of step (aii-i) is operated using a volume concentration factor of 1.5-10, preferably between 2 and 8, more preferably between 3 and 6, most preferably about 4.

In a second advantageous embodiment, the invention relates to a process for obtaining a dry milk formula, comprising the following steps:
(a-i) ultrafiltration (UF) of an animal skim milk composition comprising 70-90 wt % casein and 10-30 wt % whey proteins, based on total protein, and
(a-ii) ultrafiltration of an animal whey composition comprising 0-25 wt % casein and 75-100 wt % whey proteins, based on total protein;
(b) preferably combining of the UF retentate originating from step (a-i) with the UF retentate originating from step (a-ii);
(c) removing polyvalent ions from the UF permeate originating from step (a-i) and/or (a-ii) to obtain at least one softened UF permeate;
(d) combining the at least one softened UF permeate originating from step (c) with at least a UF retentate originating from step (a-i) and/or (a-ii), or (b) to obtain a combined product; and
(e-i) drying the combined product originating from step (d) to obtain a dry milk formula, and/or
(e-ii) drying any UF retentate originating from step (a-i) and/or (a-ii) or (b) which is not combined in step (d), and drying any of the softened UF permeates originating from step (c) which is not combined in step (d), followed by combining the dried UF retentate with the dried softened UF permeate to obtain a dry milk formula.

In this second advantageous embodiment, the ratio of casein to whey protein can be influenced by selecting the volume ratio of UF retentate originating from (a-i) and (a-ii), either in step (b) or in step (d) or (e-ii). Thus, in this embodiment, preferably the UF retentates originating from step (a-i) and (a-ii) are combined in such a ratio that a UF retentate product is obtained having a casein:whey protein weight ratio of between 75:25 to 30:70, preferably between 64:36 to 36:64, more preferably 60:40 to 40:60 or about 50:50. Preferably, a volume ratio of between 10:1 and 1:10, preferably 6:1 and 1:6, more preferably 3:1 and 1:3 of the UF retentates originating from step (a-i) and (a-ii) is used to achieve this goal. The UF retentates originating from (a-i) and/or (a-ii) or (b) is/are preferably subjected to a concentration and/or monovalent ion removal step before being combined with the softened permeate in step (d). Preferably, any or all of these UF retentates are subjected to a single concentration step (e.g. reverse osmosis and/or nanofiltration) during which also monovalent ions are removed before being combined with the softened permeate in step (d).

Furthermore, in this second advantageous embodiment, removing polyvalent ions in step (c) to obtain a softened UF permeate, is followed by a monovalent ion removal step (preferably by a nanofiltration and/or diafiltration step) before combining in step (d) takes place. This is especially preferred when ion exchange against monovalent ions is used for softening. The lactose enriched, softened UF permeate may be subjected to one, two or three nanofiltration and/or reverse osmosis steps to remove sufficient monovalent ion amounts when preparing a dry milk formulation usable for feeding a human infant.

In a preferred version of this second advantageous embodiment, the UF retentates originating from (a-i) and (a-ii) are (individually or separately) subjected to a concentration and/or monovalent ion removal step prior to combining in step (b). Next, the thus treated and combined UF retentate is combined in step (d) with a softened permeate originating from (c). Preferably, the softening in this step (c) involves removing polyvalent ions from a single UF permeate originating from combining the permeates originating from (a-i) and (a-ii) to obtain one softened UF permeate.

In an alternative aspect, a process for treating animal skim milk and animal whey is mentioned herein, comprising:
(a) ultrafiltration (UF) of a mixture of animal skim milk and animal whey (sweet and/or acid whey) over an ultrafiltration membrane having a molecular weight cut-off of 2.5-25 kDa using a volume concentration factor of 1.5-10, preferably between 2 and 8, more preferably between 3 and 6, most preferably about 4, and obtaining a retentate and a permeate. Optionally, polyvalent ions are removed from the UF permeate originating from step (a) after which the softened UF permeate is preferably subjected to a concentration and/or monovalent ion removal step. Optionally, also the UF retentate is subjected to a concentration and/or monovalent ion removal step. Preferably, the softened UF permeate, which preferably also has undergone monovalent ion removal, is mixed with the UF retentate originating from step (a), which UF retentate may or may not have undergone concentration and/or monovalent ion removal, to obtain a mixture. Said mixture is preferably dried to a dry milk formula. Preferably, the mixture of animal skim milk and animal whey comprises a casein:whey protein ratio of between 75:25 and 30:70, more preferably between 70:30 and 35:65, most preferably between 64:36 and 36:64 or about 50:50.

Definitions

The term "animal whey" herein refers to the liquid by-product obtained from the cheese-making industry. The term "whey protein" refers to proteins that are present in said animal whey, such as sweet whey or acid whey. Typically, whey proteins include, i.a. beta-lactoglobulin, alpha-lactalbumin, bovine serum albumin, immunoglobulins, lactoferrin, lactoperoxidase and/or glycomacroprotein.

The term "sweet whey" herein refers to the liquid (whey protein containing) by-product of the cheese manufacture industry which makes use of enzymatic cheese curd formation (e.g. based on casein precipitation using rennet), which material is readily accessible in the commercial market. Typically, whey proteins present in sweet whey include, i.a. beta-lactoglobulin, alpha-lactalbumin, bovine serum albumin, immunoglobulins, lactoferrin, lactoperoxidase and glycomacroprotein Conversely, the term "acid whey" herein refers to the liquid (whey protein containing) by-product of the cheese manufacture industry which makes use of (edible) acids for cheese curd formation (e.g. based on casein precipitation using acids such as citric acid), which material is readily accessible in the commercial market. Typically, whey proteins present in acid whey include, i.a. beta-lactoglobulin, alpha-lactalbumin, bovine serum albumin, immunoglobulins, lactoferrin and lactoperoxidase The term "casein" herein refers to casein or caseinate proteins as found in animal skim milk, such as bovine skim milk, more in particular cows' skim milk. Preferably, casein or caseinate is in substantially intact, non-hydrolyzed form.

By a "UF retentate originating from" is meant the liquid retentate composition that is (directly) obtained from ultrafiltration steps (a-i), (a-ii) and (a-iii). The term also refers to the UF retentates that are conveyed as (liquid) compositions from the ultrafiltration step to the optional combining step (b) or the combining with a softened UF permeate in step (d) to obtain the combined permeate/retentate product or drying in step (e-ii). Irrespective of whether between the obtaining of the UF retentate from step (a-i), (a-ii) or (a-iii) and the combining in step (d) or drying in step (e-ii), the UF retentate is subjected to a concentration step, such as reverse osmosis or nanofiltration, the term UF retentate still applies to this UF fraction. Thus, the term UF retentate is meant to denote the (protein enriched) fraction that is processed according to the steps of the invention from the ultrafiltration step up to the point where it is (re)combined with a UF permeate.

Similarly, the term "UF permeate originating from" herein means the liquid permeate composition that is (directly) obtained from ultrafiltration steps (a-i), (a-ii) and (a-iii). The term also refers to the UF permeates that are conveyed as (liquid) compositions from the ultrafiltration step to the polyvalent ion removal module, optional means for removing monovalent ions and/or optional concentration module to eventually obtain the combined permeate/retentate product of (d) or to the drying module for drying in step (e-ii). Irrespective of whether between the obtaining of the UF permeate from step (a-i), (a-ii) or (a-iii) and the combining in step (d) or drying in step (e-ii), the UF permeate is subjected to a processing step (e.g. a polyvalent ion removal step, a concentration step, reverse osmosis and/or nanofiltration), within the context of the present invention the term UF permeate still applies to this UF fraction. Thus, the term UF permeate is meant to denote the (lactose enriched) fraction that is processed according to the steps of the invention from the ultrafiltration step up to the point where it is (re)combined with a UF retentate.

As used herein, the term "polyvalent ions" refers to ions having a positive or negative charge of two or more. More in particular, this term refers to $Mg^{2-}$, $Ca^{2-}$ and polyvalent phosphate anions (e.g. $HPO_4^{2-}$, $PO_4^{2-}$). The term "monovalent ions" refers to ions having a positive or negative charge of one, in particular $Na^+$, $K^+$, $Cl^-$.

The term "removal of polyvalent ions" means that said polyvalent ions are removed from the UF permeate composition which is subjected to the polyvalent ion removal step (step (c)). Preferably, the term "removal of polyvalent ions" indicates that at least 10 or 20 wt % of the polyvalent ions that are present in said UF permeate (on dry weight basis thereof) is removed, preferably at least 50 wt %, 60 wt %, more preferably 70 wt % or at least 80 wt %, most preferably at least 90 wt %. The weight percentage (wt %) of polyvalent ion removal is determined by comparing the total weight of polyvalent ions present after step (c) to the total weight of polyvalent ions present prior to step (c). Likewise, the term "softening" is used to denote the removal of polyvalent ions. Hence, herein "softening" and "removal of polyvalent ions" is used interchangeably. Analogously, the term "softened" is used to refer to a composition from which polyvalent ions have been removed. Preferably, the term "softened" means that at least 10 or 20 wt % (on dry weight basis) of the polyvalent ions is removed from the composition by polyvalent ion removal, preferably at least 50 wt % or 60 wt %, more preferably 70 wt % or 80 wt %, most preferably at least 90 wt %. "Significant polyvalent ion removal" denotes the removal of at least 70 wt % of the polyvalent ions, preferably at least 85 wt %, more preferably at least 95 wt % or even at least 99 wt % of the polyvalent ions. Polyvalent ion removal or softening may be accompanied with monovalent ion removal, either in the same step or in a separate step. Preferably, polyvalent ion removal refers to removal of at least or all of calcium, magnesium and/or phosphate species to the extent as defined in this paragraph.

The term "removal of monovalent ions" means that said monovalent ions are removed from the composition which is subjected to the monovalent ion removal step (preferably a softened UF permeate and/or any UF retentate). In case not indicated otherwise, preferably at least 10 or 20 wt % (on dry weight basis) of the monovalent ions is removed from the composition which was subjected to a monovalent ion removal step, more preferably at least 35 wt % or 50 wt %, most preferably at least 60 wt %. Removal of monovalent ions is particularly preferred in case the process according to the invention aims to manufacture dry powder formulations intended for use as infant nutrition. "Significant monovalent ion removal" denotes the removal of at least 70 wt % of the monovalent ions, preferably at least 85 wt %, more preferably at least 95 wt % or even at least 99 wt % of the monovalent ions. Preferably, monovalent ion removal refers to removal of at least or all of sodium, potassium and/or chloride to the extent as defined in this paragraph.

The "total solid content" of a liquid composition denotes the weight percentage of solids present in the composition, based on the total weight of the composition. Solids include all non-volatiles, typically everything except water.

The term "enriched" herein refers to the situation wherein the amount of a certain constituent in a (liquid) composition (as wt % based on dry weight) is higher after a process step, when compared to the content of the same ingredient in the (liquid) composition before said process step. Preferably, the dry weight percentage of an ingredient that is enriched has a content in a stream discharged from the process step of at least 110%, more preferably at least 125%, most preferably at least 150%, based on the dry weight percentage of said ingredient in the incoming stream of said process step. Exemplary is the ultrafiltration of animal skim milk, wherein the milk proteins are retained in the retentate while water and small solutes permeate through the ultrafiltration membrane. As such, the UF retentate is enriched in milk proteins, as the content of milk proteins in the retentate, as wt % based on dry weight of the composition, is increased compared to the wt % of milk proteins in skim milk. Likewise, the UF permeate is enriched in small solutes (preferably lactose), as the amount of proteins is significantly reduced in the permeate, and lactose constitutes by far the largest part of the dry weight of the permeate.

The term "dry milk formula" refers to a dry powder which at least comprises milk proteins, in particular casein and whey, and minerals which is obtained by drying animal skim milk and animal whey and is intended for human consumption. As such, the milk formula is dried and has a water content of between 0.5 and 5 wt %, based on total weight of the formula, preferably between 1 and 4 wt % or 1.5 and 3.5 wt %. The term "dry milk infant formula" herein refers to a dry milk formula which is adapted for feeding human infants.

The term "volume concentration factor" or "VCF" is the factor at which a liquid composition is concentrated upon filtration, i.e. the total volume of the incoming stream prior to filtration divided by the total volume of the retentate after filtration, irrespective of the total solid content. Thus, when 5 L of a liquid composition is fractionated over an ultrafiltration membrane into a permeate of 4 L and a retentate of 1 L, this UF process operates with a VCF of 5/1=5.

The term "about" indicates a variation (plus and minus) of 10% of the given value, more preferably 5%.

First Liquid Composition (Animal Skim Milk) and Second Liquid Composition (Animal Whey)

The process according to the invention uses at least two sources of milk protein, lactose and minerals, the first being a (liquid) animal skim milk composition comprising 70-90 wt % casein and 10-30 wt % whey proteins, based on total protein and the second being a (liquid) animal whey composition comprising 0-25 wt % casein and 75-100 wt % whey proteins, based on total protein.

The first liquid composition is an animal skim milk composition which comprises milk proteins and lactose. It comprises amounts of minerals that are typical for animal skim milk (in the form of monovalent and polyvalent ions). The protein fraction of the first liquid composition comprises 70-90 wt % casein and 10-30 wt % whey proteins, preferably 75-85 wt % casein and 15-25 wt % whey protein, most preferably 80:20 wt % casein to whey protein, based on dry total weight of the protein fraction. Preferably, the first liquid composition comprises 20-60 wt % protein, more preferably 25-50 wt % protein based on total dry weight of the first liquid composition. Preferably, the first liquid composition comprises 25-75 wt % lactose, more preferably 40-60 wt % lactose, based on total dry weight of the first liquid composition. Preferably, the first liquid composition comprises 3-15 wt % minerals, more preferably 5-10 wt % minerals, based on total dry weight of the first liquid composition. Preferably, the first liquid composition comprises 25-75 wt % monovalent ions, more preferably 40-70 wt % monovalent ions, and 25-75 wt % polyvalent ions, more preferably 30-60 wt % polyvalent ions, based on total dry weight of the minerals. Preferably, the first liquid composition has a total solid content between 3 and 15%, more preferably between 6 and 11%, most preferably between 7.5 and 10%. The fat content of the animal skim milk is typical for animal skim milk and lies well below that of non-skim milk. In particular, the fat content lies below 3 wt % (g/100 g animal skim milk), preferably below 2 wt %, more preferably below 1 wt %, most preferably below 0.5 wt %.

In an especially preferred embodiment, the first liquid composition comprises animal skim milk or is animal skim milk. Animal skim milk (i.e. non-human skim milk), preferably from bovine animals, and may be used as such, in diluted or concentrated form, as (optionally diluted) skim milk concentrate or as reconstituted skim milk powder. Most preferably, the first liquid composition is cows' skim milk. The animal skim milk may be pretreated before it is subjected to the process according to the invention. Such pre-treatment comprises or consists of a heat-treatment step (e.g. pasteurization) and/or filtration step to reduce the bacterial load of the animal skim milk. Preferably, the animal skim milk is not pre-treated with the aim to change the mineral content or profile thereof. In particular, the animal skim milk is preferably not (significantly) softened or subjected to monovalent ion removal before it enters the present ultrafiltration process.

The second liquid is an animal whey composition which comprises protein, lactose and amounts of minerals that are typical for animal whey (in the form of monovalent and polyvalent ions). The protein fraction of the liquid animal whey composition comprises 0-25 wt % casein and 75-100 wt % whey proteins, preferably 0-10 wt % casein and 90-100 wt % whey protein, most preferably 0-5 wt % casein and 95-100 wt % whey protein, based on dry total weight of the protein fraction. Preferably, the animal whey composition comprises 5-40 wt % protein, more preferably 7-17 wt % protein based on total dry weight of the second liquid composition. Preferably, the animal whey composition comprises 40-90 wt % lactose, more preferably 60-80 wt % lactose, based on total dry weight of the second liquid composition. Preferably, the animal whey composition comprises 3-15 wt % minerals, more preferably 6-12 wt % minerals, based on total dry weight of the second liquid composition. Preferably, the animal whey composition comprises 40-90 wt % monovalent ions, more preferably 60-85 wt % monovalent ions, and 10-60 wt % polyvalent ions, more preferably 15-40 wt % polyvalent ions, based on total dry weight of the minerals. Preferably, the animal whey composition has a total solid content between 1 and 15%, more preferably between 3 and 10%, most preferably between 4 and 8%.

The animal whey is derived from making cheese wherein any non-human (skim) milk is used, preferably from bovine skim milk, most preferably cows' milk. Animal whey may be used as such, in diluted or concentrated form, as (optionally diluted) animal whey concentrate and as reconstituted animal whey from a powder. Both sweet whey and acid whey are suitable as liquid animal whey composition for use in the invention. Most preferably, the second liquid composition is sweet whey. The animal whey as used may be pretreated before it is subjected to an ultrafiltration step of the process according to the invention. Pre-treatment of the animal whey comprises or consists of heat-treatment (preferably pasteurization) and/or filtration to reduce the bacterial load of the animal whey. Preferably, the animal whey is not pre-treated with the aim to change the mineral content or profile thereof. In particular, the animal whey is not (significantly) softened or subjected to monovalent ion removal before it enters the present process.

Any pretreatment of animal skim milk or animal whey is primarily not preferred from a cost perspective: any such step is likely to increase the price of these liquid compositions, while the process of the invention is designed such that it is capable of processing these liquid compositions without any costly pretreatment step into a dry milk formulation.

Ultrafiltration (UF) Step (a-i), (a-ii), (a-iii)

In the process according to the invention, the first animal skim milk composition and the second animal whey composition are subjected to a UF step: (a-i) and (a-ii) or (a-iii). Herein water and small solutes can permeate through the membrane to end up in the UF permeate (UFP), while the UF retentate (UFR) comprises substantially all protein, which can be stated to be enriched in proteins. Small molecules which are able to permeate through the UF membrane include lactose, NPN, monovalent ions and polyvalent ions. Thus, the UFP can be stated to be enriched in lactose.

The ultrafiltration of step (a) may employ any UF membrane known in the art, including ceramic membranes, tubular and organic spiral wound membranes, preferably the UF membrane is an organic spiral wound membrane. The UF membrane has a molecular weight cut-off (MWCO) of that enables proteins (e.g. whey proteins and casein) to remain in the retentate, and allow small solutes (e.g. solutes having a molecular weight of at most 25 kDa, preferably at most 10 kDa) to permeate through the membrane. Preferably, the molecular weight cut-off is at most 25 kDa, more preferably at most 10 kDa, and preferably of at least 2.5 kDa, more preferably at least 5 kDa.

In a preferred embodiment, the ultrafiltration involves steps (a-i) and (a-ii), which are separately performed on the first liquid composition and the second liquid composition respectively, and preferably followed by combining of the UF retentates originating therefrom in step (b). Said combining or mixing in step (b) provides a (combined) UF retentate of which the protein composition is altered in the sense that the casein to whey protein weight ratio is reduced. The (weight or volume) ratio in which the UF retentates originating from steps (a-i) and (a-ii) are combined is dependent on the exact protein composition of the incoming first liquid composition but is mainly determined by the desired protein composition in the resulting UF retentate and/or the resulting dry milk formula. The skilled person is able to determine the protein composition and concentration of the incoming first liquid composition or the UF retentate thereof by methods known in the art, e.g. by the method according to FT001/IDF 20-3 (for total protein, N*6.38), IDF29-1/ISO17997-1:2004 (for casein) and FT003 (for whey, NCN, non-casein nitrogen*6.38). The exact protein composition of incoming first liquid composition (animal skim milk), or the UF retentate thereof, may vary between different animals, but even skim milk from the same animal (e.g. cow) may exhibit limited seasonal variations. In a particularly preferred embodiment, the dry milk formula is further processed into a nutritional product for human infants such as infant formulae, weaning infant formulae, follow up milk or formulae, growing-up milk or toddler milk. In this respect, the resulting weight ratio of casein: whey protein after mixing is preferably between 75:25 and 30:70, more preferably between 70:30 and 35:65, most preferably between 64:36 and 36:64 or about 50:50.

In case ultrafiltration is by step (a-i) and (a-ii), mixing of the UF retentate originating therefrom may be performed on liquid streams thus giving a liquid mixture. Alternatively, the UF retentate originating from step (a-i) and (a-ii) is subjected to drying of step (e-i) and (e-ii) prior to mixing, and a liquid composition and a solid composition are mixed (e.g. by dissolving the solid in the liquid) to obtain a liquid mixture, or two solid compositions, preferably powders, are mixed (e.g. by dry blending) to obtain a dry mixture, preferably a powder. In case drying is performed prior to mixing, it is preferred that both UF retentates originating from (a-i) and (a-ii) are subjected to the drying of step (e-i) and (e-ii) prior to mixing, and the resulting solids are dry blended. Preferably, the dried compositions are powders. In an especially preferred embodiment, both streams are liquid during mixing and the drying of step (e-i) and (e-ii) is performed on the liquid mixture, after mixing of the UF retentate originating from step (a-i) and (a-ii).

In another preferred embodiment, the UF of step (a-iii) is performed on a mixture of the (first) liquid animal skim milk composition and the (second) liquid animal whey composition of the present invention. Mixing of the first liquid composition with the second liquid composition thus is performed prior to ultrafiltration. This mixing of the first liquid composition with the second liquid composition enables the alteration of the protein composition of the first liquid composition, in particular the alteration of the protein composition of animal skim milk. The (weight or volume) ratio in which the second and the first liquid composition are mixed is dependent on the exact protein composition of the incoming first liquid composition but is mainly determined by the desired protein composition in the resulting UF retentate, and preferably the resulting dry milk formula.

Both in case the first liquid composition and the second liquid composition are subjected to ultrafiltration of step (a-i) and (a-ii) separately, or UF is by step (a-iii), the UF retentates originating from step (a-i), (a-ii) and/or (a-iii) may undergo further processing steps, either prior to the mixing of the UF retentates originating from (a-i) and/or (a-ii) or the UF retentate originating from (a-iii). Such optional further processing steps include, and are preferably limited to, concentrating the liquid composition (i.e. increasing the protein/water weight ratio, e.g. via (partial) evaporation or filtration techniques such as nanofiltration or reverse osmosis), heat-treatment (e.g. pasteurization (such as HTST, ESL or UHT) or sterilization (dry heat or moist heat)) and/or supplementation of additional water or other components. Preferably, the UF retentate originating from (a-i) and/or (a-ii) are subjected to a concentration step, prior to or after mixing of the UF retentates in step (b), preferably using nanofiltration, optionally enhanced with diafiltration, and/or reverse osmosis. Performing the concentration step on the individual UF retentates has the advantage that more flexibility and fine-tuning is allowed in the process of the invention. Preferably, the UF retentate originating from (a-iii) or (b) is subjected to a concentration step, preferably using nanofiltration, optionally enhanced with diafiltration, and/or reverse osmosis. In an optional embodiment, the drying of step (e-i) or (e-ii) occurs on each of the UF retentates originating from UF of the first and second liquid composition separately, prior to mixing. In an especially preferred embodiment, the further processing steps that may be performed on the UF retentates of (a-i) and (a-ii) prior to mixing thereof do not include any polyvalent ion removal step or any step that fractionates the proteins.

Mixing (Such as in Step (b))

Mixing of the first liquid composition with the second liquid composition prior to (a-iii), or combining of the UF retentates originating from (a-i) and (a-ii) in step (b) may be accomplished by any means known in the art, such as "in pipe" (i.e. by the joining of two incoming pipes into one single outgoing pipe), in a (balance) tank or vessel, in an agitated vessel or by any industrial mixer or blender. In case two liquid streams are mixed, dynamic mixing or static mixing may be employed. In case two dried streams (e.g. two powders) are mixed, a dry blender such as a ribbon blender, a paddle blender, a tumble blender and a vertical blender, may be employed. Preferably, the mixing step is performed on two liquid streams, preferably "in pipe" or in a balance tank. The ratio in which the first animal skim milk composition is mixed with the second animal whey composition prior to (a-iii), or mixing of the UF retentate originating from (a-i) and (a-ii) in step (b) is conveniently influenced by controlling the flow rate of the incoming compositions.

Polyvalent Ion Removal (Step (c))

Ultrafiltration of the first animal skim milk composition and the second animal whey composition in (a-i) and (a-ii), or of the mixture thereof (in step (a-iii)) affords at least one ultrafiltration permeate (UFP) comprising (or enriched in) lactose. At least one of the UF permeates originating from step (a) is softened in step (c) to obtain at least one softened UF permeate, which is subsequently combined in step (d) with any of the retentates of the ultrafiltration of step (a). In step (c) of the process according to the invention, polyvalent ions are removed from any of the UF permeates originating from step (a). In case ultrafiltration is by step (a-i) and (a-ii), two UF permeates are obtained. In case the ultrafiltration is by step (a-iii) on the mixture of the first liquid composition and the second liquid composition, one UF permeate is obtained. Thus, at least one of the UF permeates originating from UF of the first liquid composition and the UF permeate originating from UF of the second liquid composition is subjected to the polyvalent ion removal of step (c), or the UF permeate originating from (a-iii) is subjected to the polyvalent ion removal of step (c).

In case two UF permeates are obtained in the ultrafiltration of step (a-i) and (a-ii), the UF permeates originating therefrom may be combined prior to step (c), or step (c) is performed on at least one of the UF permeates, i.e. on only one of the UF permeates or on each of the UF permeates separately. In case two UF permeates are obtained from the ultrafiltration of step (a-i) and (a-ii), both UF permeates originating therefrom are subjected to the polyvalent ion removal in step (c), preferably the UFP1 and the UFP2 are combined prior to step (c) into a single UF permeate such that one UF permeate is softened in (c).

The polyvalent ion removal of step (c) enables the removal of (significant) amounts of polyvalent ions. Preferably at least 10 or 20 wt %, or preferably 50 wt %, more preferably at least 70 wt % or at least 80 wt %, most preferably at least 90 wt % of the polyvalent ions are removed. Thus, the softened UF permeate comprises at least 50 wt % less polyvalent ions, preferably at least 70 wt % less, more preferably at least 80 wt % less, most preferably at least 90 wt % less polyvalent ions, when compared to the incoming UF permeate originating from step (a).

Softening of at least one of the UF permeates originating from the UF of step (a-i) and/or (a-ii) or (a-iii) is preferably accompanied with or followed by the removal of monovalent ions. Preferably, the monovalent ion removal step causes the removal of significant amounts of monovalent ions. Preferably, at least 10 or 20 wt % of the monovalent ions are removed, more preferably at least 35 wt % or at least 50 wt %, most preferably at least 60 wt % of the monovalent ions are removed. Removal of monovalent ions (such as from the at least one UF permeate originating from step (c) and/or at least one or all of the UF retentates originating from step (a-i) and/or (a-ii) or (a-iii) or (b)) is especially preferred in case the dairy product obtained by the process according to the invention is further processed into a nutritional product suitable for infant nutrition.

Polyvalent ion removal and optionally monovalent ion removal may be accomplished using any technique known in the art, such as electrodialysis, ion exchange, salt precipitation, lactose crystallization, membrane filtration techniques such as nanofiltration, optionally enhanced with diafiltration, or combinations thereof. The preferred polyvalent ion removal technique is ion exchange. In the context of the present invention, polyvalent ion removal, optionally combined with monovalent ion removal, also includes the crystallisation of lactose from a liquid UF permeate originating from step (a-i) and/or (a-ii) or (a-iii) and simultaneously keeping (significant amounts of) the polyvalent ions and preferably (significant amounts of) the monovalent ions in solution. The obtained crystalline lactose is regarded to be a softened UF permeate in the context of the present invention, as it originates from the UF of step (a) and has (significant amounts of) the polyvalent ions removed.

The process of the invention generates at least one or two UF permeates (from (a-i) and (a-ii)), or from (a-iii). In case two UF permeates are obtained, they are preferably combined prior to being subjected to polyvalent ion removal (i.e. softening), which can be followed by monovalent ion removal. In a more costly embodiment, the two UFP permeates of (a-i) and (a-ii) are separately subjected to polyvalent ion removal and optionally monovalent ion removal, to obtain two softened UF permeates which subsequently can be combined. Each of the softened UF permeates may then be used in the recombining of step (d), preferably the softened UF permeate originating from (a-i) and the softened UF permeate originating from (a-ii) are mixed prior to the combining of step (d) or they are simultaneously combined during step (d). Each of the UF permeates originating from the UF of step (a-i) and/or (a-ii) or (a-iii) may undergo further processing steps prior to being subjected to the polyvalent ion removal of step (c). Such optional further processing steps include, preferably are limited to, concentrating the liquid stream (i.e. increasing the lactose/water weight ratio, e.g. via (partial) evaporation or filtration techniques such as nanofiltration or reverse osmosis), heat-treatment (e.g. pasteurization (such as HTST, ESL or UHT) or sterilization (dry heat or moist heat)) and/or supplementation of additional water or other components. Concentration may also be accomplished during the softening in step (c) or during the optional monovalent ion removal, e.g. during nanofiltration, optionally enhanced with diafiltration.

It is preferred that removal of polyvalent ions of at least one (or preferably all) of the UF permeates originating from step (a-i) and/or (a-ii) or (a-iii) is performed by ion exchange. Preferably, this step is followed by subjecting the at least one or all of the softened UF permeate to nanofiltration (NF) in order to concentrate it and also remove (significant amounts of) monovalent ions therefrom. Using this sequence of steps, the softened UF permeate from which (significant amounts) of monovalent ions are removed, is then combined with any of the UF retentates in step (d) or dried and combined in step (e-ii).

During ion exchange, the polyvalent ions (e.g. $Mg^{2+}$, $Ca^{2+}$, $PO_4^{3-}$) are replaced by monovalent ions (typically $Na^+$, $K^+$, $Cl^-$), and during nanofiltration these monovalent ions permeate through the nanofiltration membrane such that separation of lactose and monovalent ions is effectuated. Preferably, nanofiltration is enhanced with diafiltration, i.e. at least once an additional volume of water is added to the NF retentate, and the diluted NF retentate is subjected to NF again. Conveniently, the NF permeate, comprising monovalent ions, may be used to regenerate the ion exchange column(s).

It is especially preferred that removal of polyvalent ions of at least one (or preferably all) of the UF permeates originating from step (a-i) and/or (a-ii) is performed by a combination of steps comprising nanofiltration, salt precipitation and precipitate removal. Preferably, this combination of steps also comprises electrodialysis. More preferably, removal of polyvalent ions is performed in the following order: nanofiltration, salt precipitation and precipitate removal. Preferably, the precipitate removal is followed by a further nanofiltration step (preferably enhanced with diafiltration) or by electrodialysis, most preferably it is followed by electrodialysis. The salt precipitation step is mainly aimed at removal of polyvalent ions, in particular phosphate ions, such as calcium phosphate and magnesium phosphate, and can be achieved by creating suitable conditions under which calcium ions precipitate from the lactose-enriched liquid. These conditions include addition of a strong base, such as sodium hydroxide, pH adjustment to a neutral pH, such as between 6 and 8, and increasing the temperature to between 70 and 90° C., followed by decreasing the temperature to a between 5 and 30° C. Also calcium and magnesium levels will decrease under these precipitation conditions. Subsequently, the precipitates may be removed by any technique known in the art (e.g. filtration, centrifugation). Especially suitable to remove the precipitates is an ultrafiltration step. It is preferred that the resulting polyvalent ion-depleted UF permeate(s) is/are further desalted in a further nanofiltration step and/or an electrodialysis step, most preferably in an electrodialysis step. Any type of electrodialysis as known in the art may be employed. The result is a lactose-enriched, softened UF permeate as referred to in step (c) that can be combined in step (d) with a UF retentate originating from step (a-i) and/or (a-ii), or (a-iii) or (b) to obtain a combined product.

Combining Step (d)

Any or all of the softened UF permeates originating from step (c) is/are combined in step (d) with any of the UF retentates originating from step (a-i) and/or (a-ii) or (a-iii) to obtain a combined product. Thus, (i) the softened UF permeate originating from (a-i) and/or (a-ii) (either separate or combined, preferably combined), or (ii) the softened UF permeate originating from (a-iii) is added to any of the UF retentates originating from step (a-i) and/or (a-ii) or (a-iii). Thus, the at least one softened UF permeate originating from step (c) is combined with the UF retentate originating from (a-i) and/or (a-ii) or (a-iii) or step (b).

Each of the softened UF permeates comprises lactose. As the skilled person will appreciate, the amount of any of the softened UF permeates that is to be recombined with any of the UF retentates, may depend on the desired amount of lactose in the final dairy product, the amount and purity of lactose in each of the softened UF permeates originating from step (c) that is subjected to the combination of step (d), and the amount of residual lactose present in any of the UF retentates originating from step (a). In a preferred embodiment, at least 70 wt %, preferably at least 80 wt %, more preferably at least 90 wt % or even at least 95 wt %, most preferably at least 98 wt % of the lactose that is obtained in the UF permeate(s) originating from step (a) is combined in step (c) with the UF retentates originating from step (a). The lactose content in a liquid composition can readily be determined by skilled person, e.g. enzymatically or by HPLC.

Each of the softened UF permeates and each of the UF retentates may undergo further processing steps prior to the combining of step (d). The UF retentate originating from (a-i) and/or (a-ii) or (a-iii) or step (b) may be subjected to further processing steps prior to subjecting it to the combining of step (d). Such further processing steps include, preferably are limited to, concentrating the liquid stream (i.e. increasing the protein/water weight ratio, e.g. via (partial) evaporation or filtration techniques such as nanofiltration or reverse osmosis), heat-treatment, e.g. pasteurization (such as HTST, ESL or UHT) or sterilization (dry heat or moist heat)) and/or supplementation of additional water or other components. Preferably, the UF retentate originating from (a-i) and/or (a-ii) or (a-iii) or step (b) is subjected to a concentration step after the ultrafiltration of step (a) and prior to the combining of step (d), preferably using nanofiltration, optionally enhanced with diafiltration, and/or reverse osmosis.

In an especially preferred embodiment, the UF retentate originating from (a-i) and/or (a-ii) or (a-iii) or step (b) is not subjected to any to polyvalent ion removal step after the ultrafiltration of step (a). Preferably, the UF retentate originating from (a-i) and/or (a-ii) or (a-iii) or step (b) is not subjected to electrodialysis, ion exchange and salt precipitation. In an optional embodiment, the drying of step (e-i) or (e-ii) occurs prior to combining of step (d) and the drying of step (d). Prior to the combining of step (d), any of the softened UF permeates may undergo further processing steps. Such optional further processing steps include, preferably are limited to, concentrating the liquid stream (i.e. increasing the lactose/water weight ratio, e.g. via (partial) evaporation or filtration techniques such as nanofiltration or reverse osmosis), heat-treatment (e.g. pasteurization (such as HTST, ESL or UHT) or sterilization (dry heat or moist heat)) and/or supplementation of additional water or other components. Concentration may also be accomplished during the softening of step (c) or during monovalent ion removal, e.g. during nanofiltration, optionally enhanced with diafiltration. In an optional embodiment, the drying of step (e-i) or (e-ii) occurs prior to combining of step (d).

Drying Step (e-i) or (e-ii)

The process according to the invention involves a drying step (e-i) or (e-ii) that is performed on the one or more UF retentates originating from step (a-i) and/or (a-ii) or (a-iii) or step (b) and at least one of the softened UF permeates originating from step (c), or on the combined product originating from step (d), preferably the drying of step (e-i) is performed on the combined product originating from step (d). Drying may occur prior to the combining of step (d) and/or after the combining of step (d). In case drying occurs after combining, the combined product originating from step (d) is dried, preferably into a powder. In case drying occurs prior to combining, the one or more UF retentates originating from step (a) and at least one of the softened UF permeates originating from step (c) are dried separately, all preferably into a powder. Alternatively, drying may also occur prior to the combining of step (d) on one of the one or more UF retentates originating from step (a) and at least one of the softened UF permeates originating from step (c), preferably into a powder, and the dried composition, preferably in the form of a powder, is recombined with the remaining liquid composition. As such, an additional drying step is preferably performed to dry the combined product originating from step (d) in order to obtain a dry formula.

Drying may be accomplished by any means known in the art, e.g. spray drying, (fluidized) bed drying, drum drying, freeze drying, roller drying, etc. In an especially preferred embodiment, drying is accomplished using spray drying, optionally preceded by partial evaporation of the liquid (e.g. by nanofiltration, reverse osmosis, evaporation).

In an especially preferred embodiment, the drying of step (e-i) occurs after the combining of step (d), as this order of steps requires the least amount of drying steps to obtain a dry formula; only one on the combined product originating from step (d). As such, the UF retentate originating from (a-i) and/or (a-ii) or (a-iii) or step (b), and the liquid softened UF permeate originating from step (c) is combined with the liquid mixture of UF retentates in step (d), after which the combined product is dried in step (e-i), preferably spray-dried. Herein, only one drying step is needed in the manufacture of dry formula, preferably an infant formula base powder. Normally, more drying steps are needed, such as drying of a casein containing composition or drying of skim milk, drying of a whey protein containing composition and drying of lactose. Drying, such as spray-drying, is a costly procedure, which is typically performed at high temperatures, such as above 150° C. or even above 180° C. Reducing the amount of (spray-)drying to a single step greatly improves the efficiency of the process.

Drying step (e-ii) involves drying of any UF retentate originating from step (a-i) and/or (a-ii) or (a-iii) or (b) which is not combined in step (d), and drying any of the softened UF permeates originating from step (c) which is not combined in step (d), followed by combining the dried UF retentate with the dried softened UF permeate to obtain a dry milk formula. For instance, if the UF retentate originating from (b) is combined in step (d), it is subsequently dried in step (e-i), and not dried and combined in step (e-ii).

Where the drying of step (e-i) or (e-ii) occurs after the combining of step (d), the combined product may undergo further processing steps prior to the drying. Such optional further processing steps include, preferably are limited to, concentrating the liquid stream (i.e. increasing the protein/water weight ratio, e.g. via (partial) evaporation or filtration techniques such as nanofiltration or reverse osmosis), heat-treatment (e.g. pasteurization (such as HTST, ESL or UHT) or sterilization (dry heat or moist heat)) and/or supplementation of additional water or other components. In an especially preferred embodiment, the further processing steps that may be performed on the combined product prior to the drying of step (e-i) do not include any polyvalent ion removal step or any step that fractionates the proteins.

The drying of step (e-i) or (e-ii) obtains a dry formula, preferably in the form of a powder. In the context of the present invention, a dry formula has a water content of at most 10 wt %, preferably 0-8 wt %, more preferably 2-4 wt %, based on total weight of the composition. The dry formula may be further processed into nutritional products, preferably products suitable for feeding infants.

The process according to the invention yields a dry milk formula, preferably in the form of a powder. In a preferred embodiment, this dry milk product is further processed into a nutritional product suitable for providing nutrition to a human infant, in particular an infant between 0 and 36 months of age. Further processing typically comprises addition of further ingredients to the dairy product as known in the art, in particular one or more selected from vitamins, minerals, lipids, prebiotics, probiotics, lactose. Where appropriate, those ingredients may also be added to any of the UF retentates or UF permeates originating from step (a), or (b) the softened UF permeate originating from step (c) and the combined product originating from step (d) prior to drying, or even to any of the incoming first and second liquid compositions. The skilled person is well aware of the essential and beneficial ingredients for infant nutrition, and how they are best blended with the protein fraction. Further processing of the dry milk formula preferably comprises one or more of homogenization, heat-treatment, wet and/or dry blending of one of the above mentioned ingredients.

Irrespective of the combining of the lactose in any of the softened UF permeates originating from step (c) with any of the UF retentates originating from step (a) or (b), additional supplementation of lactose may be needed to fulfill the requirements for infant nutrition.

The process according to the invention provides sufficient removal of polyvalent ions and preferably monovalent ions, by virtue of the ultrafiltration of step (a) and the polyvalent ion removal of step (c), so that all minerals are at or below their required level for infant nutrition. In case the content of a certain mineral is below the required level, preferably that mineral is added to be on target (e.g. EU directive 91/321/EEC, or EU directive 2006/141/EC, US Food and Drug Administration 21 CFR Ch 1 part 107).

The process according to the invention affords residual water at several points, e.g. from the drying step and optionally as nanofiltration permeate, as reverse osmosis permeate. In a preferred embodiment, this residual water, optionally after further purification by e.g. reverse osmosis, is recycled in the process according to the invention, e.g. used to dilute or reconstitute the first liquid composition and/or the second liquid composition or as diafiltration water.

Intermediary Products

The process of the present invention generates several intermediary products: 1) the combined UF retentates originating from step (a-i) and (a-ii); 2) a combined product of the softened UF permeate and UF retentate of step (d); and 3) a dried combined product of step (e-i) or (e-ii) in case a dry infant milk formula is meant to be obtained.

Intermediary Product 1)

Intermediary product 1 is obtained by separately subjecting the UF retentates originating from (a-i) and (a-ii) to a nanofiltration step and combining the (protein comprising) fraction thereof (i.e. the nanofiltration retentate originating therefrom). The UF retentates are preferably combined in a weight or volume ratio of between 3:1 and 1:3.

Intermediary product 1 is characterized by (based on total dry weight of the composition): a protein content of between 40 and 52 wt %, wherein casein and whey are present in a weight ratio which lies between 70:30 and 30:70, lactose in an amount of between 35 and 50 wt %, and the presence of the following minerals: magnesium in an amount of between 0.01 and 0.30 wt %, calcium in an amount of between 0.80 and 1.70 wt %, phosphorus in an amount of between 0.60 and 1.50 wt %, sodium in an amount of between 0.10 and 0.60 wt %, chloride in an amount of between 0.05 and 0.60 wt % and potassium in an amount of between 0.60 and 1.50 wt %. Preferably, this product comprises NPN in an amount of between 1.50 and 3.30 wt %, preferably between 1.90 and 3.0 and fat in an amount of between 2.0 and 3.50, preferably between 2.30 and 3.30 and ash in an amount of between 4.0 and 10.0 wt %. Preferably, the intermediary product 1 is liquid.

More preferably, intermediary product 1 is characterized by (based on total dry weight of the composition): a protein content of between 42 and 50 wt %, wherein casein and whey are present in a weight ratio which lies between 65:35 and 35:65, lactose in an amount of between 37 and 46 wt %, and the presence of the following minerals: magnesium in an amount of between 0.05 and 0.20 wt %, calcium in an amount of between 0.95 and 1.50 wt %, phosphorus in an amount of between 0.60 and 1.30 wt %, sodium in an amount of between 0.20 and 0.45 wt %, chloride in an amount of between 0.15 and 0.40 wt % and potassium in an amount of between 0.70 and 1.20 wt %.

Intermediary Product 2)

Intermediary product 2 is obtained by separately subjecting the UF retentates originating from (a-i) and (a-ii) to a concentration step (in this case nanofiltration), combining the concentrated (protein comprising) UF retentate (i.e. the nanofiltration retentate originating therefrom) and combining the thus obtained liquid composition with the softened and concentrated UF permeate (i.e. the UF permeates originating from (a-i) and (a-ii) were combined after UF, subjected to ion exchange and concentrated by nanofiltration).

Intermediary product 2 is characterized by (based on total dry weight of the composition): a protein content of between 16 and 24 wt %, wherein casein and whey are present in a weight ratio which lies between 70:30 and 30:70, lactose in an amount of between 65 and 80 wt %, and the presence of the following minerals: magnesium in an amount of between 0.01 and 0.25 wt %, calcium in an amount of between 0.20 and 0.80 wt %, phosphorus in an amount of between 0.40 and 0.80 wt %, sodium in an amount of between 0.20 and 0.80 wt %, chloride in an amount of between 0.30 and 0.90 wt % and potassium in an amount of between 0.30 and 0.90 wt %. Preferably, this product comprises NPN in an amount of between 1.30 and 2.80 wt %, preferably between 1.50 and 2.60 and fat in an amount of between 0.5 and 2.0, preferably between 0.75 and 1.70 and ash in an amount of between 2.0 and 8.0 wt %. Preferably, the intermediary product 2 is liquid.

Intermediary Product 3)

Intermediary product 3 is a dry milk formula for feeding a human infant with an age of between 0-36 months, such as a follow-on formula or infant formula, which is obtained by (spray-)drying intermediary product 2 to which suitable amounts of additional nutrients are added to reach target levels thereof. Said nutrients include dietary fibers (in particular galacto-oligosaccharide and/or fructo-oligosaccharides), minerals (where needed), lactose (where desired), vitamins, fats. The dry formula contains between 1.0 and 3.0 wt % moisture.

Figure

The FIGURE depicts preferred embodiments of the system according to the invention. With reference to the included FIGURE, the system according to the invention is described as follows.

System

The present invention also relates to an apparatus or system specifically designed to implement the process according to the invention. The system according to the invention is preferably a modular system, in which at least three, preferably at least four modules are in fluid connection with each other, with the option that the fluid connection(s) can be closed off when and where necessary. Herein, each module may be a separate unit or two or more modules may be integrated as a single unit. Preferably, each module is a separate unit and is distinguishable as such in the system.

The system according to the invention is arranged to receive two incoming liquid compositions (i.e. the animal skim milk composition and the animal whey composition as defined herein) and to discharge one solid composition (e.g. a dry milk formula). In addition thereto, further liquid and/or solid compositions may be received by the system or discharged from the system.

The system according to the invention comprises an ultrafiltration module (1), comprising an ultrafiltration membrane (1b). The first module is designed to receive the first liquid composition (i.e. the animal skim milk composition as defined herein), or a mixture of the first and second liquid compositions, via a first inlet (1a) to a first side of the UF membrane (1b). In addition, the ultrafiltration module (1) comprises a first outlet (1c) for discharging an ultrafiltration retentate (UFR) from the first side of the UF membrane (1b) and a second outlet (1d) for discharging an ultrafiltration permeate (UFP) from the second side of the UF membrane (1b).

The UF membrane has two sides, one for receiving the first liquid composition, or a mixture of the first and second liquid compositions, and discharging the UFR, and one for discharging the UFP. The retentate is discharged from the same side of the UF membrane (1b) as the first liquid composition, or a mixture of the first and second liquid compositions, is received, and the UF permeate is discharged from the other side of the UF membrane. The UFP thus comprises only material that has permeated through the UF membrane (1b). The UF membrane (1b) employed in the ultrafiltration module (1) can be any UF membrane known in the art, including ceramic membranes and organic spiral wound membranes, preferably UF membrane (1b) is an organic spiral wound membrane. UF membrane (1b) has a molecular weight cut-off that enables proteins, such as whey proteins and casein, to remain in the retentate. Preferably, the molecular weight cut-off is at most 25 kDa, more preferably at most 10 kDa, and preferably of at least 2.5 kDa, more preferably at least 5 kDa.

Optionally, the system according to the invention comprises a second ultrafiltration module (10), comprising a second ultrafiltration membrane (10b). The second ultrafiltration module (10) is designed to receive the second liquid composition (i.e. the animal whey composition as defined herein) via a first inlet (10a) to a first side of the second UF membrane (10b). In addition, the second ultrafiltration module (10) comprises a first outlet (10c) for discharging a second ultrafiltration retentate (UFR) from the first side of the second UF membrane (10b) and a second outlet (10d) for discharging a second ultrafiltration permeate (UFP) from the second side of the second UF membrane (10b). The second UF membrane (10b) employed in the ultrafiltration module (10) can be any UF membrane known in the art, including ceramic membranes and organic spiral wound membranes, preferably UF membrane (10b) is an organic spiral wound membrane. UF membrane (10b) has a molecular weight cut-off that enables proteins, such as whey proteins and casein, to remain in the retentate. Preferably, the molecular weight cut-off is at most 25 kDa, more preferably at most 10 kDa, and preferably of at least 2.5 kDa, more preferably at least 5 kDa.

The system according to the invention comprises a polyvalent ion removal module (2) for removing polyvalent ions from one or more ultrafiltration permeates (UFPs) originating from ultrafiltration module (1) and optionally from ultrafiltration module (10). The polyvalent ion removal module (2) comprises an inlet (2a) for receiving the one or more UFPs, means for removing polyvalent ions from the UFP (2b), and an outlet (2c) for discharging a softened UFP. The polyvalent ion removal module (2) removes (significant amounts of) polyvalent ions (i.e. ions having a positive or negative charge of two or more) from the UFP, and may also remove (significant amounts of) monovalent ions from the UFP. Preferably, the polyvalent ion removal module (2) comprises means for removing (significant amounts of) polyvalent ions and means for removing (significant amounts of) monovalent ions. In case means for removing (significant amounts of) polyvalent ions and means for removing (significant amounts of) monovalent ions are both present, those means may be a single means, capable of removing both polyvalent and monovalent ions, or preferably two separate means, one capable of removing polyvalent ions (2b) and one capable of removing monovalent ions (2f). The two separate means for removing ions may be present in two distinct units within module (2), wherein an outlet (2d) of the first unit (2b), preferably for removing polyvalent ions, is in fluid connection with an inlet (2e) of the second unit (2f), preferably for removing monovalent ions, and outlet (2c) is arranged for discharging a softened UFP from the second unit (2f).

Any technique known in the art for removing polyvalent and optionally monovalent ions may be used as means for removing polyvalent ions (2b) and optionally means for removing monovalent ions (2f). Conveniently, the ion removal unit(s) is/are selected from an electrodialysis set-up (comprising ion exchange membranes and means for applying an electric potential difference over said ion exchange membranes), an ion exchange set-up (comprising at least one column filled with anionic and/or cationic resins), a salt precipitation set-up, a nanofiltration membrane, optionally with an additional inlet for receiving diafiltration water, or combinations thereof. In a preferred embodiment, module (2) comprises at least one ion exchange column comprising anion and/or cation exchange resins as polyvalent ion removal unit (2b) and a nanofiltration membrane as monovalent ion removal unit (2f). In an especially preferred embodiment, module (2) comprises at least one nanofiltration membrane, a salt precipitation set-up and a means for precipitation removal (preferably an ultrafiltration membrane), more preferably module (2) further comprises an electrodialysis set-up. Most preferably, module (2) comprises, in the following serially placed order, at least one nanofiltration membrane, a salt precipitation set-up, a means for precipitation removal (preferably an ultrafiltration membrane) and an electrodialysis set-up.

In the system according to the invention, the polyvalent ion removal module (2) is arranged in between the ultrafiltration module(s) (1 and optionally 10) and the mixing module (3).

The system according to the invention comprises a mixing module (3) for mixing at least two liquid streams, at least two solid streams (e.g. powders) or at least one liquid stream and at least one solid stream, preferably for mixing at least two liquid streams. The mixing module (3) preferably enables mixing of the UF retentate originating from ultrafiltration module (1), the UF retentate originating from ultrafiltration module (10) and the softened UF permeate originating from polyvalent ion removal module (2).

In a first preferred embodiment, the mixing module (3) is designed to mix the UF retentate originating from ultrafiltration module (1), the UF retentate originating from ultrafiltration module (10) and the softened UF permeate originating from polyvalent ion removal module (2). Thus, in the first preferred embodiment the mixing module (3) is designed to receive a softened UF permeate originating from polyvalent ion removal module (2) (either as liquid or solid) via a first inlet (3a), the UF retentate originating from ultrafiltration module (1) (either as liquid or solid) via a second inlet (3b) and the UF retentate originating from ultrafiltration module (10) (either as liquid or solid) via a third inlet (3d). The mixing module (3) further comprises an outlet (3c) for discharging a recombined product (either as liquid or solid).

In a second preferred embodiment, two mixing modules exist, one mixing module (30) for mixing the first liquid composition with the second liquid composition and for discharging a mixture of the first and second liquid compositions, and one mixing module (3) for mixing the mixture of the UF retentate originating from ultrafiltration module (1) and the UF retentate originating from ultrafiltration module (10) with the softened UF permeate originating from polyvalent ion removal module (2). In the second preferred embodiment the first mixing module (30) is designed to receive the first liquid composition via a first inlet (30a) and the second liquid composition via a second inlet (30b), and to discharge the mixture of the first and second liquid compositions via an outlet (30c). Thus, the first mixing module (30) comprises a first inlet (30a) and a second inlet (30b) for receiving liquid compositions and an outlet (30c) for discharging a mixed liquid composition. The second mixing module (3) is designed to receive the softened UF permeate originating from polyvalent ion removal module (2) (either as liquid or solid) via a first inlet (3a) and the mixture of the UF retentate originating from ultrafiltration module (1) and the UF retentate originating from ultrafiltration module (10) (either as liquid or solid) via a second inlet (3b), and to discharge the recombined product via an outlet (3c). Thus, the second mixing module (3) comprises a first inlet (3a) and a second inlet (3b) for receiving liquid and/or solid compositions and an outlet (3c) for discharging a recombined liquid or solid composition.

In the mixing module(s) according to the invention, mixing may be accomplished by any method known in the art. Mixing may be accomplished by merely combining two or more compositions. The mixing module(s) may further comprises mixing means. The mixing means may be any means suitable for mixing two compositions known in the art, such as "in pipe" (i.e. by the joining of two or more incoming pipes into one single outgoing pipe), in a (balance) tank or vessel, in an agitated vessel, or by any industrial mixer or blender known in the art. Suitable mixing means include means for mixing two liquid compositions, e.g. dynamic mixing or static mixing, or for mixing two solid compositions (e.g. two powders), e.g. a dry blender such as a ribbon blender, a paddle blender, a tumble blender and a vertical blender, or one liquid composition and one solid composition, preferably for mixing two liquid compositions. In an especially preferred embodiment, the mixing means is "in pipe" or in a balance tank.

Mixing module (3) and optional mixing module (30) may be arranged in the system before the ultrafiltration module (1) or after the ultrafiltration module (1). In case the mixing module (30) is arranged before the ultrafiltration module (1), the first liquid composition and the second liquid composition are mixed prior to ultrafiltration. In case the mixing module (3) is arranged after the ultrafiltration modules (1) and (10), the first and second liquid compositions are each ultrafiltered separately prior to mixing of the UF retentates originating from ultrafiltration modules (1) and (10).

The system according to the invention preferably comprises a drying module (4), which is arranged for drying at least one liquid composition. The drying module (4) is designed to receive a liquid composition (e.g. the recombined product) via an inlet (4a) to a drying means (4b), and to discharge a solid composition via an outlet (4c) from the drying means (4b). The drying means (4b) may be any means suitable for drying a liquid composition known in the art, e.g. a spray dryer, a (fluidized) bed dryer, a drum dryer, a freeze dryer, a roller dryer, etc. In an especially preferred embodiment, the drying means (4b) is a spray dryer.

The drying module (4) may be arranged in the system before the mixing module (3) or after the mixing module (3), as long as it is arranged after the ultrafiltration module (1) and optional ultrafiltration module (10). In case the drying module (4) is arranged in between the ultrafiltration module (1) and optional ultrafiltration module (10) and the mixing module (3), at least one of the ultrafiltration retentates originating from ultrafiltration modules (1) and optionally (10) is dried prior to mixing. In case the drying module (4) is arranged after the mixing module (3), the ultrafiltration retentates are first mixed and then the mixture of the UF retentate originating from ultrafiltration module (1) and the UF retentate originating from ultrafiltration module (10) is dried.

Optionally, the system according to the invention comprises further drying module(s), each for drying at least one liquid stream. Each drying module is designed to receive a liquid composition via an inlet to a drying means, and to discharge a solid composition via an outlet from the drying means. The drying means may be any means suitable for drying a liquid composition known in the art, e.g. a spray dryer, a (fluidized) bed dryer, a drum dryer, a freeze dryer, a roller dryer, etc. In an especially preferred embodiment, the drying means is a spray dryer. A further drying module may be arranged in the system before the mixing module (3) and after the second ultrafiltration module (10), preferably in case the first drying module (4) is arranged before the mixing module (3) and after the first ultrafiltration module (1). As such, the ultrafiltration retentates discharged from both ultrafiltration modules (1) and (10) are dried prior to mixing in the mixing module (3).

In a first preferred embodiment, the system according to the invention comprises two ultrafiltration modules (1) and (10). Outlet (1c) of the first ultrafiltration module (1) is in fluid connectivity with inlet (3b) of the mixing module (3), and outlet (1d) is in fluid connectivity with inlet (2a) of the polyvalent ion removal module (2). Outlet (10c) of the second ultrafiltration module (10) is in fluid connectivity with inlet (3d) of the mixing module (3), and outlet (10d) is in fluid connectivity with inlet (2a) of the polyvalent ion removal module (2). Outlet (2c) is in fluid connectivity with inlet (3a) of the mixing module (3), and outlet (3c) is in fluid connectivity with inlet (4a) of the drying module (4). Inlets (1a) and (10a) are arranged to receive liquid compositions to the system (e.g. animal skim milk and animal whey) and outlet (4c) is arranged to discharge a solid composition from the system (e.g. a dry milk formula). Especially preferred is that module (2) comprises a polyvalent ion removal unit (2b), preferably at least one ion exchange column, and a monovalent ion removal unit (2f), preferably a nanofiltration membrane.

In a second preferred embodiment, the system according to the invention comprises two mixing modules (3) and (30). Outlet (30c) of the first mixing module (30) is in fluid connectivity with inlet (1a) of the ultrafiltration module (1). Outlet (1c) is in fluid connectivity with inlet (3b) of the second mixing module (3), and outlet (1d) is in fluid connectivity with inlet (2a) of the polyvalent ion removal module (2). Outlet (2c) is in fluid connectivity with inlet (3a) of the second mixing module (3), and outlet (3c) is in fluid connectivity with inlet (4a) of the drying module (4). Inlets (30a) and (30b) are arranged to receive liquid compositions to the system (e.g. animal skim milk and animal whey) and outlet (4c) is arranged to discharge a solid composition from the system (e.g. a dry milk formula). Especially preferred is that module (2) comprises a polyvalent ion removal unit (2b), preferably at least one ion exchange column, and a monovalent ion removal unit (2f), preferably a nanofiltration membrane.

The system according to the invention may comprise further modules or further features as described here below.

In a further preferred embodiment, the system according to the invention comprises one or more concentration module(s) for concentrating (a) liquid stream(s). Such a concentration module comprises an inlet for receiving a liquid composition to a means for concentrating, a means for concentrating and an outlet for discharging a concentrated liquid composition. Any concentration technique known in the art may be used as means for concentrating.

Conveniently, the means for concentrating is selected from an evaporation set-up (e.g. by increasing the temperature and/or reducing the pressure) or a membrane filtration set-up (e.g. a reverse osmosis membrane or a nanofiltration membrane). A concentration module may also be combined with the polyvalent ion removal module (2), as such accomplishing concentration during monovalent ion removal (e.g. using nanofiltration optionally enhanced with diafiltration).

In a further preferred embodiment, the system according to the invention comprises means for recycling (residual) water from outgoing streams to incoming streams. Residual water may be obtained in the drying module (4), in the polyvalent ion removal module (2) (e.g. as nanofiltration permeate) and in each of the concentration modules (e.g. as reverse osmosis permeate). Preferably, at least one of the drying module (4), the polyvalent ion removal module (2) and a concentration module further comprises an additional outlet for discharging water from the module, more preferably at least one of the concentration modules comprises such an additional outlet. Most preferably, the drying module (4), the polyvalent ion removal module (2) and each of the concentration modules each comprise such an outlet. The residual water may be used to dilute any of the incoming liquid compositions, e.g. the first liquid composition and/or the second liquid composition, or may be used as diafiltration water, e.g. in the polyvalent ion removal module (2). Preferably, the first ultrafiltration module (1) and/or the second ultrafiltration module (10) module and/or the polyvalent ion removal module (2) further comprise an additional inlet for receiving residual water. The skilled person appreciates that the outlets for discharging residual water are in fluid connectivity with the inlets for receiving residual water, preferably by means of a conduit, wherein optionally one or more collection tanks or one or more further purification means (e.g. reverse osmosis membranes) are integrated.

In a further preferred embodiment, the system according to the invention comprises means for heat-treating a liquid composition. Any of the liquid compositions which are led through the system according to the invention may suitably be heat-treated, using any heat-treatment technique known in the art. Conveniently, the system according to the invention comprises at least one heat-treating module, arranged for heat-treating a liquid composition. Such a heat-treatment module comprises an inlet for receiving a liquid composition to a means for heat-treatment, a means for heat-treatment and an outlet for discharging a heat-treated liquid composition. Any heat-treatment technique known in the art may be used as means for heat-treatment, such as pasteurization or sterilization set-up. Preferably, a plate heat-exchanger (PHE) and/or a direct steam injection/infusion (DSI) is used as heat-treatment means.

The system according to the invention may further comprise chilling means, preferably to enable the system to operate at a temperature below 15° C., more preferably below 12° C. The skilled person will understand that freezing of the liquid stream is highly undesirable, at that the temperature should be kept high enough for the different liquid streams to remain liquid. Typically, the chilling means enable the system to operate at a temperature of at least 2° C. Each module may have a separate chilling means, or a central chilling means may be installed to regulate the temperature in the entire system. Preferably, the chilling means are selected from cooling tower, heat-exchanger (plate or tubular, preferably in connection with the PHE used for heat-treatment), cooling by coolant (heat-transfer fluid), pumpable ice technique.

In case a module comprise a nanofiltration membrane, the nanofiltration may optionally be enhanced by diafiltration. To accomplish diafiltration, the module requires an additional inlet for receiving water to the first side of the nanofiltration membrane, as such enabling dilution and re-filtration of the nanofiltration retentate. In a preferred embodiment, the polyvalent ion removal module (2) comprises such an additional inlet (2d).

All filtration modules preferably comprise means to facilitate the permeations of the solvent and optionally small solutes through the membrane. Any means known in the art may be used to accomplish easy permeation, such as using gravity or the application of transmembrane pressure (TMP). TMP may be accomplished by pressurizing the first side of the membrane (i.e. the retentate side) or by depressurizing the second side of the membrane (i.e. the permeate side). Suitably, a pump using hydrostatic pressure to pressurize the first side of the membrane and/or a pump generating suction at the second side of the membrane is used. Suitable pumps include centrifugal pumps and positive displacement pumps, preferably centrifugal pumps are used.

In the system according to the invention, the different modules are interconnected, i.e. the outlet of one module is in fluid connectivity with the inlet of another module, preferably by means of a conduit. The different modules of the system, especially the ultrafiltration module (1), the mixing module (3) and the drying module (4), may be interconnected in different configurations, as long as the system is arranged to implement the process according to the invention.

The system according to the invention preferably operates with 500-2500 kg, more preferably 800-1800 kg, most preferably 1000-1400 kg dry matter of the first liquid composition, preferably of animal skim milk, incoming per hour. The system according to the invention preferably operates with 1500-5000 kg, more preferably 2200-4000 kg, most preferably 2600-3000 kg dry matter of the second liquid composition, preferably of animal whey, incoming per hour. The system according to the invention preferably operates with 750-4000 kg, more preferably 1000-3000 kg, most preferably 1500-2000 kg UF retentate discharged from the ultrafiltration module(s) per hour from both incoming streams combined. The process according to the invention preferably operates with 1000-5000 kg, more preferably 1500-4000 kg, most preferably 2000-2500 kg UF permeate discharged from the ultrafiltration module(s) per hour from both incoming streams combined.

The invention will now be illustrated by several examples which are not meant to limit the invention in any manner.

EXAMPLES

Example 1

400 kg of pasteurized cows' skim milk with a casein to whey protein weight ratio of 80:20 was subjected to ultrafiltration over a Synder ST3838 UF membrane having a MWCO of 10 kDa. Ultrafiltration was performed at a temperature between 8 and 10° C., with a transmembrane pressure of 2 bar and a VCF of about 2. The permeate was collected in a flow rate of up to 260 L/h. 208 kg of a UF permeate (UFP1) and 211 kg of a UF retentate (UFR1) was obtained. The compositions of the incoming skim milk and the products of the ultrafiltration are given in table 1. The slight increase in total weight of the final products (UFR1 and UFP1) compared to the incoming skim milk can be attributed to dilution of the plant dead volume during the changeover from product to water during plant flushing. As can be seen from the data of table 1, the UF retentate is enriched in proteins, whereas the UF permeate is enriched in lactose.

TABLE 1

Compositions of example 1 (in wt % based on total dry weight)

| Component | Cows' skim milk | UFR1 | UFP1 |
| --- | --- | --- | --- |
| protein | 36.2 | 51.7 | 0.0 |
| Lactose | 51.8 | 36.5 | 87.6 |
| ash | 8.7 | 8.4 | 9.1 |
| —Na | 0.46 | 0.35 | 0.70 |
| —K | 1.83 | 1.40 | 2.69 |
| —Cl | 1.13 | 0.66 | 1.61 |
| —P | 1.16 | 1.32 | 0.76 |
| —Ca | 1.37 | 1.67 | 0.80 |
| —Mg | 0.12 | 0.12 | 0.13 |

Example 2

1000 kg of pasteurized sweet whey with whey proteins as the sole protein source was subjected to ultrafiltration over a Synder ST3838 UF membrane having a MWCO of 10 kDa. Ultrafiltration was performed at a temperature between 10 and 12° C., and with a transmembrane pressure of 2 bar and a VCF of about 5. The permeate was collected in a flow rate of up to 400 L/h. 818 kg of a UF permeate (UFP2) and 195 kg of a UF retentate (UFR2) was obtained. The compositions of the incoming sweet whey and the products of the ultrafiltration are given in table 2. The slight increase in total weight of the final products (UFR1 and UFP1) compared to the incoming sweet whey can be attributed to dilution of the plant dead volume during the changeover from product to water during plant flushing.

TABLE 2

Compositions of example 2 (in wt % based on total dry weight)

| Component | Sweet whey | UFR2 | UFP2 |
| --- | --- | --- | --- |
| Protein | 9.7 | 35.1 | 0.0 |
| lactose | 76.9 | 50.0 | 87.4 |
| ash | 8.6 | 6.7 | 9.3 |
| —Na | 0.67 | 0.49 | 0.74 |
| —K | 2.58 | 1.92 | 2.84 |
| —Cl | 1.44 | 0.95 | 1.69 |
| —P | 0.82 | 0.58 | 0.73 |
| —Ca | 0.81 | 0.69 | 0.86 |
| —Mg | 0.14 | 0.10 | 0.15 |

Example 3

The UFP1 of example 1 and the UFP2 of example 2 were combined in a weight ratio of 20/80 to obtain 799 kg of a combined UFP. The combined UFP was subjected to ion exchange to produce a softened UFP, and subsequently to nanofiltration enhanced with diafiltration. Ion exchange employed an anionic resin charged with chloride ions and a cationic resin charged with sodium ions, to exchange the polyvalent ions for sodium and chloride. Ion exchange operated at a pH between 2.4 and 4.3 and a temperature between 5 and 10° C. Nanofiltration employed a Synder NFX 3838 NF membrane having MWCO of 150-300 Da, operated at a temperature between 8 and 22° C., and with a transmembrane pressure of 2 bar. The permeate was collected in a flow rate of up to 400 L/h. Two diafiltration volumes of, 200 L of water were added sequentially when the retentate total solids content reached 20%. The softened UFP was concentrated to a final total solid content of about 20%. 178 kg of a softened UFP concentrate was obtained as a nanofiltration retentate (NFR1), together with 1225 kg of a nanofiltration permeate (NFP1). The compositions of the incoming combined UFP and the products of the nanofiltration are given in table 3. The great majority of the polyvalent ions were removed during ion exchange and the great majority of the monovalent ions ended up in the NFP1. The softened UFP concentrate (NFR1) contained almost exclusively lactose.

TABLE 3

Compositions of example 3 (in wt % based on total dry weight)

| component | Combined UFP | NFR1 | softened UFP concentrate (NFP1) |
| --- | --- | --- | --- |
| protein | 0.0 | 0.0 | 0.0 |
| lactose | 86.8 | 97.2 | 11.2 |
| ash | 9.2 | 2.4 | 74.7 |
| —Na | 0.71 | 0.61 | 24.7 |
| —K | 2.66 | 0.32 | 9.8 |
| —Cl | 1.70 | 0.84 | 44.9 |

TABLE 3-continued

Compositions of example 3 (in wt % based on total dry weight)

| component | Combined UFP | NFR1 | softened UFP concentrate (NFP1) |
|---|---|---|---|
| —P | 0.75 | 0.23 | 0.34 |
| —Ca | 0.84 | 0.06 | 0.36 |
| —Mg | 0.14 | 0.00 | 0.00 |

Example 4

The UFR1 of example 1 was concentrated and subjected to monovalent ion removal by nanofiltration over a Synder NFX 3838 NF membrane having MWCO of 150-300 Da. Nanofiltration operated at a temperature between 8 and 20° C., and with a transmembrane pressure of 2 bar and VCF of about 2. The permeate was collected in a flow rate of up to 220 L/h. 108 kg of an UFR1 concentrate as nanofiltration retentate (NFR2) was obtained, together with 149 kg of a nanofiltration permeate (NFP2). Using nanofiltration, the UFR1 is concentrated to a total solid content of about 18%. The composition of the NFR2 product of the nanofiltration is given in table 4.

TABLE 4

Composition of example 4 (in wt % based on total dry weight)

| component | NFR2 |
|---|---|
| protein | 55.6 |
| lactose | 33.4 |
| ash | 7.8 |
| —Na | 0.26 |
| —K | 1.06 |
| —Cl | 0.27 |
| —P | 1.33 |
| —Ca | 1.70 |
| —Mg | 0.12 |

Example 5

The UFR2 of example 2 was concentrated and subjected to monovalent ion removal by nanofiltration over a Synder NFX 3838 NF membrane having MWCO of 150-300 Da. Nanofiltration operated at a temperature between 8 and 20° C., and with a transmembrane pressure of 2 bar. The permeate was collected in a flow rate of up to 400 L/h. 73 kg of an UFR2 concentrate as nanofiltration retentate (NFR3) was obtained, together with 148 kg of a nanofiltration permeate (NFP3). Using nanofiltration, the UFR2 is concentrated to a total solid content of about 18%. The composition of the NFR3 product of the nanofiltration is given in table 5.

TABLE 5

Composition of example 5 (in wt % based on total dry weight)

| component | NFR3 |
|---|---|
| protein | 35.8 |
| lactose | 51.0 |
| ash | 5.6 |
| —Na | 0.35 |
| —K | 0.82 |
| —Cl | 0.26 |
| —P | 0.64 |

TABLE 5-continued

Composition of example 5 (in wt % based on total dry weight)

| component | NFR3 |
|---|---|
| —Ca | 0.66 |
| —Mg | 0.11 |

Example 6

The aim is to produce a mixture with a casein:whey ratio of 40:60. To this end, the UFR1 concentrate of example 4 (NFR2) is mixed with the UFR2 concentrate of example 5 (NFR3) in a weight ratio of 59 kg:87.62 kg (based on a liquid composition) or in a weight ratio of 10.59 kg:16.45 kg (based on a dry composition) respectively, to produce a mixture of UFR1 and UFR2. Besides the in table 6 mentioned constituents, the NFR2/NFR3 mixture comprises NPN at 2.82 wt % and fat at 3.08 wt %.

TABLE 6

Composition of example 6 (in wt % based on total dry weight)

| component | NFR2/NFR3 mixture |
|---|---|
| protein | 43.6 |
| lactose | 44.1 |
| ash | 6.5 |
| —Na | 0.32 |
| —K | 0.91 |
| —Cl | 0.27 |
| —P | 0.91 |
| —Ca | 1.07 |
| —Mg | 0.12 |

Combining the UFR1 concentrate of example 4 (NFR2) with the UFR2 concentrate of example 5 (NFR3) in another selected weight ratio allows to obtain a mixture which comprises casein to whey proteins in a desired ratio that falls within the claimed range. Addition of a softened and optionally concentrated UF permeate (which is substantially free from proteins) allows one to increase the amount of lactose to a desired level. The obtained mixture can be spray-dried into a dry milk formula. For instance, addition of suitable amounts of required nutrients and minerals, where needed, allows one to obtain a growing-up formula with a 40:60 casein to whey protein ratio. Alternative mixtures of UFR1 and UFR2 where made to produce other mixtures of UFR1 and UFR2 that comprised a 50:50 and 60:40 casein to whey ratio.

Example 7

A softened UFP concentrate was recombined with the mixture of UFR1 and UFR2 to produce a composition with a 60:40 casein to whey protein ratio. The softened UFP concentrate was combined with the mixture of UFR1 and UFR2. The UFR1 concentrate of example 4 (NFR2), the UFR2 concentrate of example 5 (NFR3) and the softened UFP concentrate (NFR1) of example 3 are mixed in a weight ratio of 88.51 kg:43.81 kg:188.77 kg (based on a liquid composition) or in a weight ratio of 15.88 kg:8.23 kg:38.57 kg (based on a dry composition) respectively, to produce a mixture of UFR1, UFR2 and softened UFP.

Besides the in table 7 mentioned constituents, the NFR1/NFR2/NFR3 mixture comprises NPN at 1.67 wt % and fat at 1.01 wt %.

TABLE 7

Composition of example 7 (in wt % based on total dry weight)

| Component | NFR1/NFR2/NFR3 mixture |
|---|---|
| Protein | 18.8 |
| Lactose | 74.9 |
| Ash | 4.2 |
| —Na | 0.49 |
| —K | 0.58 |
| —Cl | 0.62 |
| —P | 0.56 |
| —Ca | 0.55 |
| —Mg | 0.05 |

Combining the softened UFP concentrate with the mixture of UFR1 and UFR2 in other selected weight ratios allows obtaining a mixture which comprises casein to whey proteins in a desired ratio that falls within the claimed range. The addition of the softened and optionally concentrated UF permeate (which is substantially free from proteins) allows to increase the amount of lactose to a higher levels as shown. The obtained mixture can be spray-dried into a dry milk formula. For instance, addition of suitable amounts of required nutrients and minerals, where needed, allows one to obtain a growing-up formula with a 60:40 casein to whey protein ratio. Alternative mixtures where made in a similar fashion to obtain compositions that comprised a 50:50 and 40:60 casein to whey ratio.

Example 8

Fractionation of reconstituted skim milk powder (SMP) and reconstituted sweet whey powder (SWP) according to the invention was performed using a combination of unit operations, to prepare three types of infant nutrition base products. Reconstituted SMP and reconstituted SWP were each subjected to UF (step 1), the retentates (UFRs) were subjected to NF (step 2) and the permeates (UFPs) to poly- and monovalent ion removal (step 3). Subsequently, the NF retentates (NFRs) from step 2 and the softened UFPs from step 3 are combined in step 4. The compositions of SMP and SWP are given in table 8. Each step of the process operated in steady state conditions for 4-10 h, during which an acceptable average flux was achieved throughout the entire production sequence. Concentration factors for the membrane filtration steps are given in "mass concentration factor" (MCF), which are calculated in the same way as a VCF, but using weight instead of volume. It can be assumed that MCF=VCF, since all densities are close to that of water (1000 kg/m$^3$) and all solids present in the incoming stream end up in the retentate and permeate streams. Over time, slight variations were observed for the MCFs. Here below, the MCF range is given or the deviation from the given value was less than 10% at all times.

TABLE 8

Compositions of SMP and SWP (per 100 g powder)

| Component | SMP | SWP |
|---|---|---|
| Protein (g) | 35.2 | 13.5 |
| Lactose (g) | 53.3 | 76.6 |
| ash (g) | 7.83 | 8.38 |
| —Na (mg) | 397 | 666 |
| —K (mg) | 1690 | 3040 |
| —Cl (mg) | 979 | 1500 |
| —P (mg) | 1130 | 722 |
| —Ca (mg) | 1260 | 614 |

TABLE 8-continued

Compositions of SMP and SWP (per 100 g powder)

| Component | SMP | SWP |
|---|---|---|
| —Mg (mg) | 106 | 130 |
| —Zn (mg) | 4.8 | 0.17 |

Step 1: Fractionation of reconstituted SMP and reconstituted SWP was performed using two 3838 10 kDa ultrafiltration membranes in series (Synder Filtration), to separate the feed materials into a protein enriched retentate and a lactose/milk salts enriched permeate at 10° C. The reconstituted skim milk feed material (~2800 kg) at a total solids content of 8.64% w/w solid, pH of 6.9 at 5.8° C., was fractionated using a mass concentration factor of 2, while the reconstituted sweet whey feed material (~3500 kg) at a total solids content of 6.1% w/w solid, pH of 6.63 at 6.8° C. was fractionated using a mass concentration factor of 5.5 The macronutritional and mineral distribution of the liquid retentate and permeate streams from UF1 and UF2 are presented in table 9. The permeates were collected with an average flux of 10.54 kg/m$^2$/h (for SM) and 20.21 kg/m$^2$/h (for SW).

TABLE 9

Compositions of UFRs and UFPs (per 100 g)

| Component | UFR1 (SM) | UFP1 (SM) | UFR2 (SW) | UFP2 (SW) |
|---|---|---|---|---|
| Total solids (g) | 11.57 | 5.29 | 9.00 | 5.32 |
| Protein (g) | 6.36 | 0.14 | 3.47 | 0.16 |
| Lactose (g) | 4.14 | 4.68 | 4.57 | 4.71 |
| ash (g) | 0.97 | 0.48 | 0.66 | 0.44 |
| —Na (mg) | 38.5 | 34.0 | 38.2 | 32.6 |
| —K (mg) | 162.4 | 142.3 | 117.9 | 99.8 |
| —Cl (mg) | 79.1 | 91.7 | 91.7 | 107.9 |
| —P (mg) | 142.3 | 37.5 | 77.9 | 30.4 |
| —Ca (mg) | 190.5 | 32.8 | 79.1 | 19.2 |
| —Mg (mg) | 13.7 | 6.0 | 10.0 | 6.1 |
| —Mn (mg) | 0.004 | 0.00 | 0.001 | 0.00 |
| —Fe (mg) | 0.042 | 0.10 | 0.051 | 0.072 |
| —Cu (mg) | 0.014 | 0.07 | 0.033 | 0.010 |
| —Zn (mg) | 0.80 | 0.16 | 0.032 | 0.010 |

Step 2: Post ultrafiltration of the reconstituted skim milk and sweet whey powder streams, the subsequent retentates UFR1 and UFR2 were concentrated and partially demineralised using a 3838 150-300 Da nanofiltration (NF) membrane (GEA Filtration, Denmark). For concentration and demineralisation of ~500 kg of UFR1 (pH 6.82 at 6° C.) to 26% w/w solids content, NF1 used two NF membranes in series; while for concentration and demineralisation of ~640 kg UFR2 (pH 5.88 at 6.5° C.) to 28% w/w solids content a single NF membrane was used in NF2. NF1 operated within a mass concentration factor range of 1.8-2.2 while NF2 operated within a mass concentration factor range of 2.6-3. Both NF1 and NF2 were operated within the temperature range of 13-14° C. The permeates were collected with an average flux of 1.64 kg/m$^2$/h (for UFR1) and 9.64 kg/m$^2$/h (for UFR2). The macronutritional and mineral distribution of the liquid retentate and permeate streams from NF1 and NF2 are presented in table 10. The process yielded for NFR1 and NFR2 milk protein concentrate (MPC50) and whey protein concentrate (WPC35) powders respectively.

TABLE 10

Compositions of NFRs and NFPs (per 100 g)

| Component | NFR1 (SM) | NFP1 (SM) | NFR2 (SW) | NFP2 (SW) |
|---|---|---|---|---|
| Total solids (g) | 24.30 | 0.36 | 24.63 | 0.35 |
| Protein (g) | 12.8 | 0.08 | 9.45 | 0.08 |
| Lactose (g) | 9.67 | 0.05 | 13.65 | 0.05 |
| ash (g) | 1.66 | 0.23 | 1.29 | 0.28 |
| —Na (mg) | 51.2 | 23.6 | 51.7 | 52.7 |
| —K (mg) | 222.8 | 92.3 | 168.7 | 156.6 |
| —Cl (mg) | 55.3 | 92.9 | 109.4 | 87.4 |
| —P (mg) | 273.1 | 13.0 | 203.8 | 103.6 |
| —Ca (mg) | 381.2 | 2.02 | 210.6 | 79.0 |
| —Mg (mg) | 27.7 | 0.23 | 26.6 | 24.1 |
| —Mn (mg) | 0.008 | 0.00 | 0.002 | 0.00 |
| —Fe (mg) | 0.061 | 0.00 | 0.12 | 0.019 |
| —Cu (mg) | 0.021 | 0.007 | 0.068 | 0.009 |
| —Zn (mg) | 1.61 | 0.013 | 0.067 | 0.011 |

TABLE 11

Compositions of NFR3s and NFP3s (per 100 g)

| Component | NFR3 (SM) | NFP3 (SM) | NFR3 (SW) | NFP3 (SW) |
|---|---|---|---|---|
| Total solids (g) | 20.67 | 0.32 | 23.55 | 0.42 |
| Protein (g) | 0.33 | 0.09 | 0.37 | 0.09 |
| Lactose (g) | 19.28 | 0.00 | 18.59 | 0.00 |
| ash (g) | 1.07 | 0.24 | 1.08 | 0.30 |
| —Na (mg) | 58.6 | 24.0 | 65.59 | 33.41 |
| —K (mg) | 253.8 | 94.9 | 255.94 | 118.96 |
| —Cl (mg) | 68.0 | 106.9 | 80.05 | 132.15 |
| —P (mg) | 133.4 | 5.68 | 115.36 | 10.61 |
| —Ca (mg) | 125.4 | 1.80 | 100.31 | 1.06 |
| —Mg (mg) | 22.9 | 0.16 | 27.69 | 0.16 |
| —Mn (mg) | 0.0002 | 0.0002 | 0.0002 | 0.000 |
| —Fe (mg) | 0.00 | 0.0005 | 0.0231 | 0.0212 |
| —Cu (mg) | 0.006 | 0.007 | 0.0075 | 0.0078 |
| —Zn (mg) | 0.023 | 0.012 | 0.0402 | 0.016 |

Step 3: Milk and whey permeates from UF1 and UF2 respectively were concentrated and partially demineralised separately by NF3 using two 3838 150-300 Da nanofiltration (NF) membranes in series (GEA Filtration, Denmark). For concentration and demineralisation ~1000 kg of UFP1 (pH 5.9 at 6.9° C.) was concentrated to 22% w/w solids content. For concentration and demineralisation ~1000 kg of UFP2 (pH 5.6 at 6° C.) was concentrated to 22% w/w solids content. For concentration of both UFP1 and UFP2, NF3 operated within a mass concentration factor range of 3.5-4 at a temperature of 10° C. Average permeate fluxes amounted to 9.73 kg/m$^2$/h (for UFP1) and 10.9 kg/m$^2$/h (for UFP2). The macronutritional and mineral distribution of the liquid retentate and permeate streams from NF3 are presented in table 11.

Post concentration and demineralisation of UFP1 and UFP2 by NF3, both retentates were subsequently indirectly heated to 82° C. using an indirect plate heat exchanger feeding a 250 L jacketed stainless steel vessel. Once the retentate from NF3 was in the storage vessel the pH was adjusted to 7.2 (at 82° C.) using a 30% w/w NaOH solution, causing the precipitation of calcium salts primarily of phosphate and citrate. The precipitated solution was held at 82° C. for 20 minutes to maximise the precipitation reaction followed by cooling to 20° C. using an indirect plate heat exchanger feeding a second 250 L jacketed stainless steel vessel. The precipitated material was removed from the NF3 retentate stream (post precipitation) by UF3 using two 3838 10 kDa ultrafiltration membranes in series (Synder Filtration). UF3 operated within a mass concentration factor of 10 at a temperature of 20° C. The macronutritional and mineral distribution of the liquid retentate streams from UF3 are presented in table 12. The process according to the invention yielded ~50% demineralisation in the UF3 retentates compared to UFP1 and UFP2 on a dry matter basis. The liquid retentate streams from UF3 were combined in a stainless steel vessel at 40° C. The compounded batch (65 kg total mass) constituted the UFR3 from skim milk and the UFR3 from sweet whey in a mass ratio of 20:80 respectively. The batch was subsequently demineralised using a pilot electrodialysis plant (P1 EDR-Y, MemBrain). The endpoint of the demineralisation was determined based on the relationship between conductivity of the demineralised lactose and the ash content therein (endpoint: conductivity<1 mS; ash content<0.75 wt % based on dry matter). Once the endpoint of the demineralisation was reached, the demineralised lactose concentrate stream was cooled to 5° C. followed by determination of total solids content of the ED product as 16.62% w/w.

TABLE 12

Compositions of UFRSs and UFP3s (per 100 g)

| Component | UFP3 (SM) | UFP3 (SW) | ED product |
|---|---|---|---|
| Total solids (g) | 17.95 | 19.26 | 16.62 |
| Protein (g) | 0.30 | 0.35 | 0.33 |
| Lactose (g) | 16.78 | 17.98 | 16.17 |
| ash (g) | 0.87 | 0.93 | 0.12 |
| —Na (mg) | 159.9 | 142.2 | 18.4 |
| —K (mg) | 226.7 | 230.3 | 3.0 |
| —Cl (mg) | 64.9 | 79.5 | 2.4 |
| —P (mg) | 66.5 | 71.5 | 19.5 |
| —Ca (mg) | 15.0 | 36.9 | 7.9 |
| —Mg (mg) | 16.3 | 19.8 | 0.0 |
| —Mn (mg) | 0.00 | 0.00 | 0.00 |
| —Fe (mg) | 0.00 | 0.0204 | 0.00 |
| —Cu (mg) | 0.016 | 0.0078 | 0.00 |
| —Zn (mg) | 0.020 | 0.0168 | 0.00 |

Step 4: The final phase in the process was the production of nutritionally balanced infant/toddler nutrition using the materials prepared in the preceding steps (1-3). As such the lactose concentrate solution produced in step 3 (ED product) was used as the liquid stream to which the NFR1 and NFR2 were added, giving the desired (legally required) content and ratio of protein (casein/whey) and lactose for first-stage infant milk (IF), follow on milk (FO) and growing up milk (GUM). The streams were blended in the ratios mentioned in table 13. At this stage the liquid concentrate stream comprising demineralised lactose (from ED product), MPC (from NFR1) and WPC (from NFR2) was pre-heated to 50° C. followed by dosing of oil and GOS to meet the nutritional requirements. The liquid concentrate infant formula streams were then heated treated at 85° C. for 5 min in an indirect tubular heat exchanger (Mircothermics), homogenised downstream from the heat treatment at first and second stage pressures of 125 and 25 bar respectively (at 60° C.), followed by evaporation to 55% w/w solids content in a single effect falling film evaporator, operating at 55° C.; and spray drying using a single stage spray dryer equipped with 2 fluid nozzle atomisation operating at an inlet and outlet temperature of 175° C. and 90° C. respectively. The nutritional composition of the IF, FO and GUM powders produced is outlined in table 14.

Note that all components mentioned in table 14, except for the fat and part of the carbohydrates (GOS) originate from the skim milk and sweet whey starting materials. All components in table 14 are either within the acceptable ranges for that component, or are below those acceptable ranges. For those components who's content is below acceptable, fortification would be required to increase their content to within acceptable ranges. It is important to note that none of the mentioned components, not even the polyvalent ions, are present above their acceptable range, which would be unacceptable as taking out is impossible, while adding one or a few components may happen straightforward. The possibility of preparing different infant nutritional products, all according to legal standards, demonstrates the versatility and flexibility of the process according to the invention.

TABLE 13

Blending ratios, expressed in kg of liquid concentrate per 100 kg of dry powder

| Streams | IF | FO | GUM |
|---|---|---|---|
| NFR1 (kg) | 43.49 | 55.74 | 56.33 |
| NFR2 (kg) | 61.72 | 47.47 | 47.97 |
| ED product (kg) | 191.83 | 215.90 | 208.86 |

TABLE 14

Compositions of IF, FO and GUM powders (per 100 g)

| Component | IF | FO | GUM |
|---|---|---|---|
| Moisture (g) | 1.26 | 1.68 | 2.38 |
| Protein (g) | 11.5 | 11.69 | 11.56 |
| Carbohydrate (g) | 56.62 | 59.23 | 63 |
| Fat (g) | 28.71 | 25.49 | 21.3 |
| Ash (g) | 1.91 | 1.91 | 1.76 |
| —Na (mg) | 192 | 156 | 171 |
| —K (mg) | 290 | 278 | 240 |
| —Cl (mg) | 88.5 | 83.5 | 109.5 |
| —P (mg) | 310 | 300 | 285 |
| —$SO_4$ (mg) | 36 | 33 | 38 |
| —I (mg) | 37 | 36 | 37 |
| —Se (µg) | 7.7 | 8.4 | 6.7 |
| —Ca (mg) | 354 | 351 | 318 |
| —Mg (mg) | 41 | 39 | 34 |
| —Zn (mg) | 1 | 1.1 | 1.06 |
| Carnite (mg) | 21.3 | 23.6 | 23.8 |
| Choline (mg) | 216 | 231 | 235 |
| Inositol (mg) | 39.9 | 47.4 | 50.4 |
| Biotin (µg) | 10.7 | 11.4 | 11 |
| Folic acid (µg) | 41.4 | 38.8 | 32.1 |
| Pantothenic acid (mg) | 2.31 | 2.88 | 2.84 |
| Vitamin B1 (mg) | 0.17 | 0.17 | 0.17 |
| Vitamin B12 (µg) | 1.38 | 1.39 | 1.29 |
| Bitamin B2 (mg) | 1.23 | 1.2 | 1.27 |
| Vitamin B6 (mg) | 0.1205 | 0.1140 | 0.1288 |

The invention claimed is:

1. A process for obtaining a dry milk formula, comprising:
   (a) ultrafiltering (UF)
     (a-i) an animal skim milk composition comprising 70-90 wt % casein and 10-30 wt % whey proteins, based on total protein, and
     (a-ii) an animal whey composition comprising 0-25 wt % casein and 75-100 wt % whey proteins, based on total protein; and
   (b) optionally, combining of the UF retentate originating from step (a-i) with the UF retentate originating from step (a-ii);
   or
   (a-iii) a mixture of the compositions of (i) animal skim milk composition comprising 70-90 wt % casein and 10-30 wt % whey proteins, based on total protein, and (ii) animal whey composition comprising 0-25 wt % casein and 75-100 wt % whey proteins, based on total protein,
   (c) removing polyvalent ions
     (c-i) from the UF permeate originating from step (a-i) and/or the UF permeate originating from step (a-ii); or
     (c-ii) from the UF permeate originating from step (a-iii) to obtain at least one softened UF permeate;
   (d) combining
     (d-i) the at least one softened UF permeate originating from step (c-i) with a UF retentate originating from step (a-i) and/or (a-ii); or
     (d-ii) the softened UF permeate originating from step (c-ii) with a UF retentate originating from (a-iii); or
     (d-iii) the at least one softened UF permeate originating from step (c-i) with the UF retentate originating from step (b)
   to obtain a combined product; and
   (e) drying
     (e-i) the combined product originating from step (d); or
     (e-ii) drying any of (i)-(iii):
       (i) the UF retentate originating from step (a-i) and the UF retentate originating from step (a-ii); or
       (ii) the UF retentate originating from step (a-iii); or
       (iii) the UF retentate originating from step (b),
       prior to the combining in step (d);
       and drying any of the softened UF permeates originating from step (c) prior to the combining in step (d), followed by combining the dried UF retentate with the dried softened UF permeate in step (d); or
     (e-iii) drying one of (i)-(iv)
       the UF retentate originating from step (a-i) and/or the UF retentate originating from step (a-ii);
       (ii) the UF retentate originating from step (a-iii);
       (iii) the UF retentate originating from step (b),
       (iv) the UF
       followed by subjecting the dried composition to the combining in step (d) and then dry the combined product originating from step (d),
   to obtain a dry milk formula.

2. The process according to claim 1, wherein the animal skim milk comprises 75-85 wt % casein and 15-25 wt % whey proteins, based on total protein.

3. The process according to claim 1, wherein the animal whey composition comprises 0-20 wt % casein and 80-100 wt % whey proteins, based on total protein.

4. The process according to claim 1, wherein a UF permeate originating from step (a-i) and a UF permeate originating from step (a-ii) are combined prior to said removal of polyvalent ions of step (c).

5. The process according to claim 1, wherein a UF retentate originating from step (a-i) and/or (a-ii) is/are concentrated prior to the combining of step (b), prior to the combining of step (d) or prior to the drying of step (e).

6. The process according to claim 1, wherein the UF permeate originating from step (a-i) is combined with a permeate originating from (a-ii) prior to polyvalent ion removal of step (c).

7. The process according to claim 1, wherein the softened UF permeate originating from step (c) is concentrated prior to the combining of step (d) or the drying of step (e-i), and/or the combined product of step (d) is concentrated, prior to the drying of step (e).

8. The process according to claim 5, wherein concentration occurs by reverse osmosis and/or nanofiltration.

9. The process according to claim 1, wherein polyvalent ion removal of step (c) occurs by electrodialysis, ion exchange, lactose crystallization and/or salt precipitation.

10. The process according to claim 1, wherein the softened UF permeate of step (c) is subjected to monovalent ion removal; and/or one of (i)-(iii) is subjected to monovalent ion removal:
 (i) the UF retentate originating from step (a-i) and/or (a-ii); or
 (ii) the UF retentate originating from step (a-iii); or
 (iii) the UF retentate originating from step (b).

11. The process according to claim 1, wherein a UF retentate and/or a UF permeate is heat treated by DSI prior to the drying of step (e), wherein the UF retentate is selected from:
 (i) the UF retentate originating from step (a-i) and/or (a-ii);
 (ii) the UF retentate originating from step (a-iii); and
 (iii) the UF retentate originating from step (b),
and the UF permeate is selected from:
 (iv) the UF permeate originating from step (a-i) and/or (a-ii); and
 (v) the UF permeate originating from step (a-iii).

12. The process according to claim 1, wherein drying of step (e) is by spray-drying.

13. The process according to claim 1, wherein the combined product originating from step (d) or the dried combined product of (e) is further processed into a nutritional product for providing nutrition to infants.

14. The process according to claim 1, wherein the animal skim milk composition and animal whey composition are combined in such a ratio that a product is obtained having a casein:whey protein weight ratio of between 75:25 to 30:70, wherein the combining occurs prior to step (a-iii), in step (b) or in step (d).

15. The process according to claim 1, wherein
 (i) the mixture of the animal skim milk composition and animal whey composition which is subjected to step (a-iii);
 (ii) the combined UF retentate of step (b);
 (iii) the combined product of step (d); or
 (iv) the dry milk formula of (e) has a casein:whey protein weight ratio of between 75:25 to 30:70.

16. A composition, comprising: a protein content of between 40 and 52 wt %, wherein casein and whey are present in a weight ratio which lies between 70:30 and 30:70, lactose in an amount of between 35 and 50 wt %; and the following minerals: magnesium in an amount of between 0.01 and 0.30 wt %, calcium in an amount of between 0.80 and 1.70 wt %, phosphorus in an amount of between 0.60 and 1.50 wt %, sodium in an amount of between 0.10 and 0.60 wt %, chloride in an amount of between 0.05 and 0.60 wt % and potassium in an amount of between 0.60 and 1.50 wt %, all based on dry weight of the composition.

17. A composition, comprising: a protein content of between 16 and 24 wt %, wherein casein and whey are present in a weight ratio which lies between 70:30 and 30:70, lactose in an amount of between 65 and 80 wt %; and the following minerals: magnesium in an amount of between 0.01 and 0.25 wt %, calcium in an amount of between 0.20 and 0.80 wt %, phosphorus in an amount of between 0.40 and 0.80 wt %, sodium in an amount of between 0.20 and 0.80 wt %, chloride in an amount of between 0.30 and 0.90 wt % and potassium in an amount of between 0.30 and 0.90 wt % all based on dry weight of the composition.

18. A dry milk formula obtainable by the process according to claim 1.

19. A modular system, comprising:
 (1) an ultrafiltration module, comprising
  (1a) an inlet for receiving a first liquid composition and/or a second liquid composition, or a mixture thereof, to a first side of an ultrafiltration membrane,
  (1b) the ultrafiltration membrane,
  (1c) a first outlet for discharging an ultrafiltration retentate (UFR) from the first side of the ultrafiltration membrane, and
  (1d) a second outlet for discharging an ultrafiltration permeate (UFP) from the second side of the ultrafiltration membrane;
 (2) a polyvalent ion removal module, comprising
  (2a) an inlet for receiving the UFP originating from the ultrafiltration module (1),
  (2b) means for removing polyvalent ions, and
  (2c) an outlet for discharging a softened UFP;
 (3) at least one mixing module, comprising
  (3a) a first inlet for receiving the softened UFP originating from the polyvalent ion removal module (2),
  (3b1) a second inlet for receiving the first liquid composition or an UFR of the first liquid composition and a third inlet for receiving the second liquid composition or an UFR of the second liquid, or
  (3b2) a second inlet for receiving the mixture of the first liquid composition and the second liquid composition or an UFR of the first liquid composition and an UFR of the second liquid composition, and
  (3c) an outlet for discharging a recombined product; and
 (4) a drying module, comprising
  (4a1) a first inlet for receiving the UFR originating from the ultrafiltration module (1) and a second inlet for receiving the softened UFP originating from the polyvalent ion removal module (2), or
  (4a2) an inlet for receiving the recombined product originating from the mixing module (3),
  (4b) drying means, and
  (4c) an outlet for discharging a dried composition.

* * * * *